(12) United States Patent
Kim et al.

(10) Patent No.: US 11,249,911 B2
(45) Date of Patent: Feb. 15, 2022

(54) STORAGE DEVICE, MEMORY SYSTEM, AND OPERATING METHOD FOR MANAGING HOST-RESIDENT L2P MAP CACHE

(71) Applicant: SAMSUNG ELECTRONICS CO., LTD., Suwon-si (KR)

(72) Inventors: Dong-Woo Kim, Suwon-si (KR); Dongin Kim, Hwaseong-si (KR); Songho Yoon, Yongin-si (KR); Youngjoon Jang, Yongin-si (KR); Wookhan Jeong, Pocheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 16/900,021

(22) Filed: Jun. 12, 2020

(65) Prior Publication Data

US 2021/0034536 A1 Feb. 4, 2021

(30) Foreign Application Priority Data

Aug. 1, 2019 (KR) .......................... 10-2019-0093997

(51) Int. Cl.
| | | |
|---|---|---|
| *G06F 12/0873* | (2016.01) | |
| *G06F 12/02* | (2006.01) | |
| *G06F 12/0882* | (2016.01) | |
| *G06F 13/16* | (2006.01) | |
| *G06F 9/48* | (2006.01) | |
| *G06F 12/14* | (2006.01) | |

(52) U.S. Cl.
CPC ........ *G06F 12/0873* (2013.01); *G06F 9/4881* (2013.01); *G06F 12/0246* (2013.01); *G06F 12/0882* (2013.01); *G06F 12/1441* (2013.01); *G06F 13/1673* (2013.01); *G06F 2212/7201* (2013.01)

(58) Field of Classification Search
CPC .............. G06F 12/0873; G06F 9/4881; G06F 12/0246; G06F 12/0882; G06F 12/1441; G06F 13/1673; G06F 2212/7201; G06F 12/0848; G06F 3/0644
See application file for complete search history.

(56) References Cited

U.S. PATENT DOCUMENTS

| | | |
|---|---|---|
| 7,679,133 B2 | 3/2010 | Son et al. |
| 8,553,466 B2 | 10/2013 | Han et al. |
| 8,559,235 B2 | 10/2013 | Yoon et al. |
| 8,654,587 B2 | 2/2014 | Yoon et al. |
| 9,268,706 B2 | 2/2016 | Kunimatsu et al. |

(Continued)

*Primary Examiner* — Charles Rones
*Assistant Examiner* — Hewy H Li
(74) *Attorney, Agent, or Firm* — F. Chau & Associates, LLC

(57) ABSTRACT

A memory system includes a storage device including a nonvolatile memory device and a storage controller configured to control the nonvolatile memory device, and a host that accesses the storage device. The storage device transfers map data, in which a physical address of the nonvolatile memory device and a logical address provided from the host are mapped, to the host depending on a request of the host. The host stores and manages the transferred map data as map cache data. The map cache data are managed depending on a priority that is determined based on a corresponding area of the nonvolatile memory device.

19 Claims, 25 Drawing Sheets

(56) References Cited

U.S. PATENT DOCUMENTS

| | | | |
|---|---|---|---|
| 9,507,722 B2 | 11/2016 | Desai et al. | |
| 9,507,723 B2 | 11/2016 | Lin et al. | |
| 9,563,382 B2 | 2/2017 | Hahn et al. | |
| 9,858,008 B2 | 1/2018 | Liu et al. | |
| 10,229,051 B2 | 3/2019 | Hwang et al. | |
| 11,030,106 B2 * | 6/2021 | Muthiah | G06F 12/10 |
| 2009/0300269 A1 | 12/2009 | Radke et al. | |
| 2011/0233648 A1 | 9/2011 | Seol | |
| 2017/0351452 A1 | 12/2017 | Boyd et al. | |
| 2018/0039578 A1 | 2/2018 | Yun et al. | |
| 2018/0239697 A1 * | 8/2018 | Huang | G06F 12/0246 |
| 2019/0056886 A1 | 2/2019 | Nagarajan et al. | |
| 2019/0095116 A1 | 3/2019 | Igahara et al. | |
| 2019/0121540 A1 | 4/2019 | Shin et al. | |
| 2020/0409856 A1 * | 12/2020 | Navon | G06F 12/0246 |
| 2021/0026777 A1 * | 1/2021 | Byun | G06F 12/1072 |

* cited by examiner

STORAGE DEVICE, MEMORY SYSTEM, AND OPERATING METHOD FOR MANAGING HOST-RESIDENT L2P MAP CACHE

CROSS-REFERENCE TO RELATED APPLICATIONS

This application claims priority under 35 U.S.C. § 119 to Korean Patent Application No. 10-2019-0093997 filed on Aug. 1, 2019, in the Korean Intellectual Property Office, the disclosure of which is incorporated by reference herein in its entirety.

TECHNICAL FIELD

Exemplary embodiments of the inventive concept described herein relate to a semiconductor memory device, and more particularly, to a storage device using a memory of a host, and an operating method thereof.

DISCUSSION OF THE RELATED ART

A semiconductor memory device may be classified as a volatile memory device or a non-volatile memory device. A volatile memory device is a memory device in which stored data are lost when power is turned off. Examples of a volatile memory device include a static random access memory (SRAM) or a dynamic random access memory (DRAM). Anon-volatile memory device is a memory device in which stored data are retained even when power is turned off. Examples of a non-volatile memory device include a flash memory device, a phase-change RAM (PRAM), a magnetic RAM (MRAM), a resistive RAM (RRAM), or a ferroelectric RAM (FRAM).

Currently, a flash memory device is widely used as a high-capacity storage medium in a computing device, and various technologies for supporting a high-speed operation of the flash memory device are being developed. For example, a universal flash storage (UFS) interface defined by the JEDEC stand and may support a higher operating speed than a conventional flash memory based storage device.

SUMMARY

Exemplary embodiments of the inventive concept provide a memory system that stores and manages meta data of a storage device using a turbo write buffer at a host, and a meta data managing method thereof.

According to an exemplary embodiment, a memory system includes a storage device including a nonvolatile memory device and a storage controller configured to control the nonvolatile memory device, and a host that accesses the storage device. The storage device transfers map data, in which a physical address of the nonvolatile memory device and a logical address provided from the host are mapped, to the host depending on a request of the host. The host stores and manages the transferred map data as map cache data. The map cache data are managed depending on a priority that is determined based on a corresponding area of the nonvolatile memory device.

According to an exemplary embodiment, an operation method of a storage device which includes a nonvolatile memory device including a user storage area and a turbo write buffer providing a higher access speed than the user storage area includes receiving an access request from a host, transferring map data configured depending on an execution of the access request, and an identifier indicating whether the map data correspond to the turbo write buffer or the user storage area, to the host, and configuring and managing map cache data by using the map data. Managing the map cache data includes determining a priority of the map cache data depending on the identifier, and updating or deleting the map cache data depending on the priority when the map cache data are updated or deleted.

According to an exemplary embodiment, a storage device which communicates with a host by using a universal flash storage (UFS) interface includes a nonvolatile memory device including a user storage area and a turbo write buffer area having a higher access speed than the user storage area, and a storage controller that transfers map data, in which physical addresses of the nonvolatile memory device and logical addresses of the host are mapped, to the host. The storage controller adds an identifier, indicating whether the map data correspond to the user storage area or the turbo write buffer area, to the map data, and transfers the identifier to the host. In a cache management operation of the map data, an update or delete priority of the map data is determined based on the identifier.

BRIEF DESCRIPTION OF THE DRAWINGS

The above and other objects and features of the inventive concept will become more apparent by describing in detail exemplary embodiments thereof with reference to the accompanying drawings, in which.

DETAILED DESCRIPTION

Figure 1:
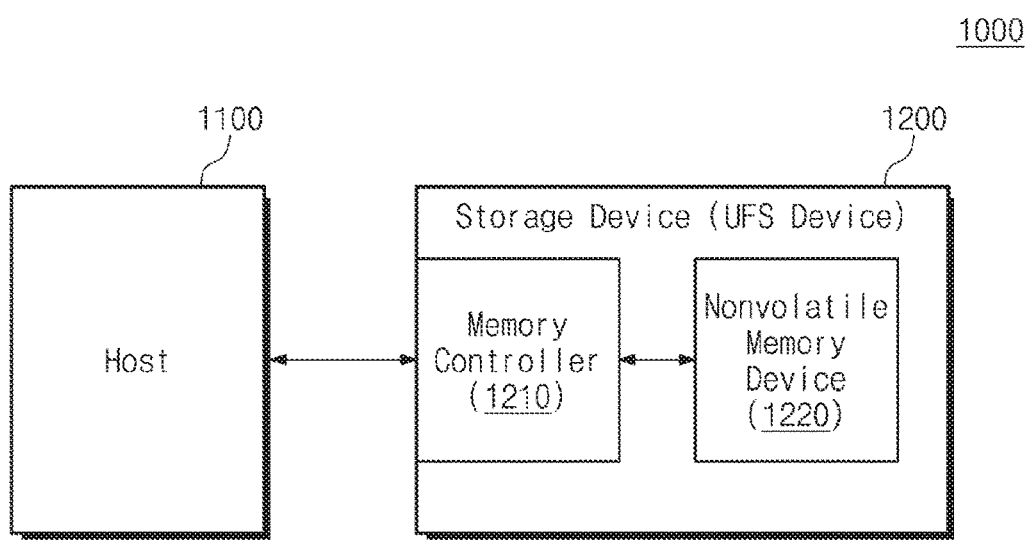
FIG. 1 is a block diagram illustrating a storage system according to an exemplary embodiment of the inventive concept.

Exemplary embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

It will be further understood that descriptions of features or aspects within each exemplary embodiment should typically be considered as available for other similar features or aspects in other exemplary embodiments, unless the context clearly indicates otherwise.

As used herein, the singular forms "a", "an" and "the" are intended to include the plural forms as well, unless the context clearly indicates otherwise.

FIG. 1 is a block diagram illustrating a storage system according to an exemplary embodiment of the inventive concept.

Referring to FIG. 1, a storage system 1000 may include a host 1100 and a storage device 1200. In an exemplary embodiment of the inventive concept, the storage system 1000 may include one of various computing systems such as a personal computer, a notebook, a tablet, a smartphone, and a wearable device.

The host 1100 may store data in the storage device 1200 or may read data stored in the storage device 1200. For example, the host 1100 may transfer a write command and write data to the storage device 1200 to store data in the storage device 1200. Alternatively, to read data from the storage device 1200, the host 1100 may transfer a read command to the storage device 1200 and may receive data from the storage device 1200.

The host 1100 may include a main processor such as a central processing unit (CPU) or an application processor (AP). In addition, the host 1100 may include an auxiliary processor, which assists the main processor, such as a graphics processing unit (GPU) or a neural processing unit (NPU).

The storage device 1200 may operate under control of the host 1100. For example, the storage device 1200 may include a controller 1210 and a nonvolatile memory device 1220. The controller 1210, also referred to as a memory controller, may operate in response to a command received from the host 1100. For example, the controller 1210 may receive a write command and write data from the host 1100 and may store the received write data in the nonvolatile memory device 1220 in response to the received write command.

Alternatively, the controller 1210 may receive a read command from the host 1100 and may read data stored in the nonvolatile memory device 1220 in response to the received read command. Afterwards, the controller 1210 may transfer the read data to the host 1100. In an exemplary embodiment of the inventive concept, the nonvolatile memory device 1220 may be a NAND flash memory device, but the inventive concept is not limited thereto.

In an exemplary embodiment of the inventive concept, the host 1100 may communicate with the storage device 1200 based on a universal flash storage (UFS) interface or protocol defined by the JEDEC standard. For example, the host 1100 and the storage device 1200 may exchange packets in the form of a UFS protocol information unit (UPIU). The UPIU may include various information defined by an interface (e.g., a UFS interface) between the host 1100 and the storage device 1200. However, the inventive concept is not limited thereto. Below, for convenience of description, the terms "command", "UPIU", and "data" may be interchangeable, and the terms may have the same meaning or different meanings depending on the embodiments disclosed herein.

In an exemplary embodiment of the inventive concept, the storage device 1200 may support a turbo write function or a turbo write feature. The turbo write function may be enabled or disabled under control of the host 1100. When the turbo write function is enabled under control of the host 1100, the storage device 1200 may perform a turbo write operation. The turbo write operation may be performed based on a single level cell (SLC) buffering scheme but, not limited thereto, and may provide improved performance (in particular, improved write performance) of the storage device 1200. The turbo write operation will be more fully described with reference to drawings below.

Figure 2:
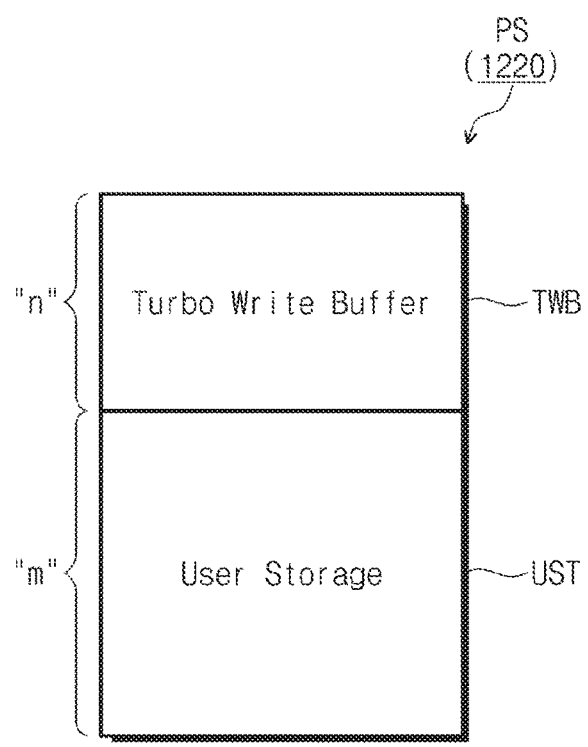
FIG. 2 is a diagram illustrating a physical storage space of a storage device of FIG. 1 according to an exemplary embodiment of the inventive concept.

FIG. 2 is a diagram illustrating a physical storage space PS of the storage device 1200 of FIG. 1. The physical storage space PS of the storage device 1200 may indicate a physical area of the nonvolatile memory device 1220, in which user data are actually stored. In other words, the physical storage space PS may be a space that is identified by the host 1100 as a capacity of the storage device 1200. The host 1100 and the storage device 1200 may be implemented in compliance with the UFS protocol proposed by JEDEC for the purpose of communicating with each other, but the inventive concept is not limited thereto.

In an exemplary embodiment of the inventive concept, the storage device 1200 may further include any other storage space (e.g., a space not identified by the host 1100 as a capacity of the storage device 1200, such as a reserved area, a meta area for storing meta data, or an overprovisioning area for improving performance), as well as the physical storage space PS illustrated in FIG. 2. However, for convenience of description, additional description associated with the other storage space will be omitted (or minimized), and a description will be focused on the physical storage space PS where user data are stored.

Referring to FIGS. 1 and 2, the physical storage space PS of the storage device 1200 may include a turbo write buffer area (TWB) (hereinafter referred to as a "turbo write buffer") and a user storage area (UST) (hereinafter referred to as a "user storage"). The user storage and the turbo write buffer may be referred to as a first region, a second region, a third region, etc.

The turbo write buffer TWB may correspond to a portion (e.g., "a") of the physical storage space PS of the nonvolatile memory device 1220. The user storage UST may correspond to the remaining portion (e.g., "b") of the physical storage space PS of the nonvolatile memory device 1220. Alternatively, the user storage UST may correspond to the entire (e.g., a+b) the physical storage space PS of the nonvolatile memory device 1220.

In an exemplary embodiment of the inventive concept, each memory cell corresponding to the turbo write buffer TWB may be an SLC, and each memory cell corresponding to the user storage UST may be a triple level cell (TLC). Alternatively, each of the memory cells corresponding to the turbo write buffer TWB may store n-bit data (n being a positive integer), and each of the memory cells corresponding to the user storage UST may store m-bit data (m being a positive integer greater than n). In other words, the turbo write buffer TWB may be an area supporting a higher write speed than the user storage UST.

The inventive concept is not limited to the above description regarding the turbo write buffer TWB and the user storage UST. For example, the number (e.g., k) of bits stored in each memory cell corresponding to the turbo write buffer TWB may be more than or equal to the number (e.g., i) of bits stored in each memory cell corresponding to the user storage UST (i.e., k≥i). In an exemplary embodiment of the inventive concept, in the turbo write buffer TWB and the user storage UST, the number of bits to be stored per memory cell may be determined by various factors of the storage device 1200 such as reliability and lifetime. Alternatively, the turbo write buffer TWB and the user storage UST may be divided by various factors such as reliability and lifetime of the storage device 1200, as well as the number of bits to be stored per memory cell.

In an exemplary embodiment of the inventive concept, each of the reference symbols "a" and "b" may be the number of memory blocks in the corresponding storage space. Values of "a" and "b" may be variously changed depending on sizes of the turbo write buffer TWB and the user storage UST and a scheme to implement the turbo write buffer TWB and the user storage UST (e.g., SLC, multi-level cell (MLC), TLC, and quad level cell (QLC)).

As described with reference to FIG. 1, the storage device 1200 may support a normal write function and a turbo write function. When the turbo write function is enabled by the host 1100, the storage device 1200 may perform the turbo write operation. When the turbo write function is disabled by the host 1100, the storage device 1200 may perform the normal write operation.

For example, in the case where the turbo write function is enabled, the storage device 1200 may preferentially write the write data received from the host 1100 in the turbo write buffer TWB. In this case, because write data received from the host 1100 are written in the turbo write buffer TWB (e.g., SLC program), a fast operating speed may be secured compared to the case where the normal write operation (e.g., TLC program) is performed on the user storage UST. In the case where the turbo write function is disabled, the storage device 1200 may not first write the write data in the turbo write buffer TWB. Depending on an internally assigned policy (e.g., a normal write policy), the storage device 1200 may directly write the write data in the user storage UST or may write the write data in the turbo write buffer TWB. How to write the write data may be determined based on various factors, such as the data share of the turbo write buffer TWB and a status of the physical storage space PS, depending on the normal write policy.

As another example, the normal write policy may first write the write data in the user storage UST. To explain the inventive concept more clearly, in the following detailed description, the normal write policy is a policy in which write data are preferentially written in the user storage UST. However, the inventive concept is not limited thereto.

In an exemplary embodiment of the inventive concept, data written in the turbo write buffer TWB may be flushed or migrated to the user storage UST depending on an explicit command from the host 1100 or an internally assigned policy.

Figure 3A:
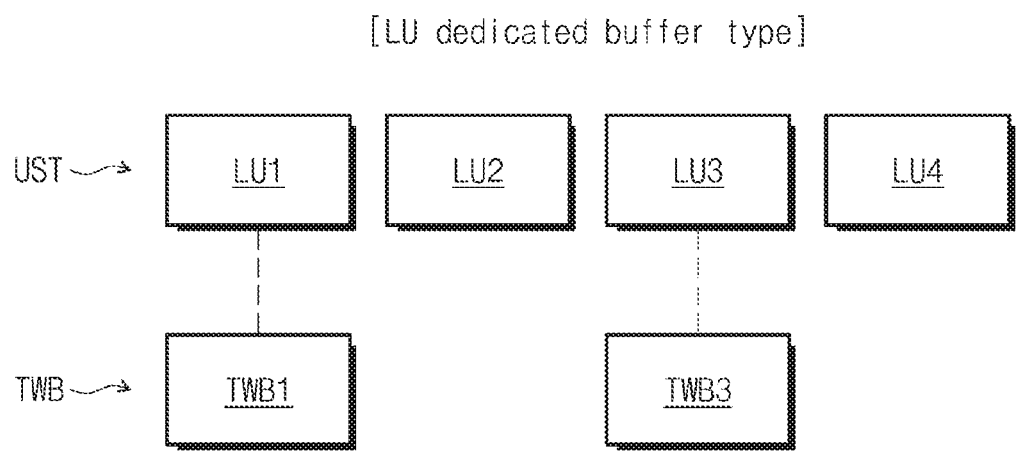
FIGS. 3A and 3B are diagrams for describing a turbo write buffer type of FIG. 2 according to an exemplary embodiment of the inventive concept.
Figure 3B:
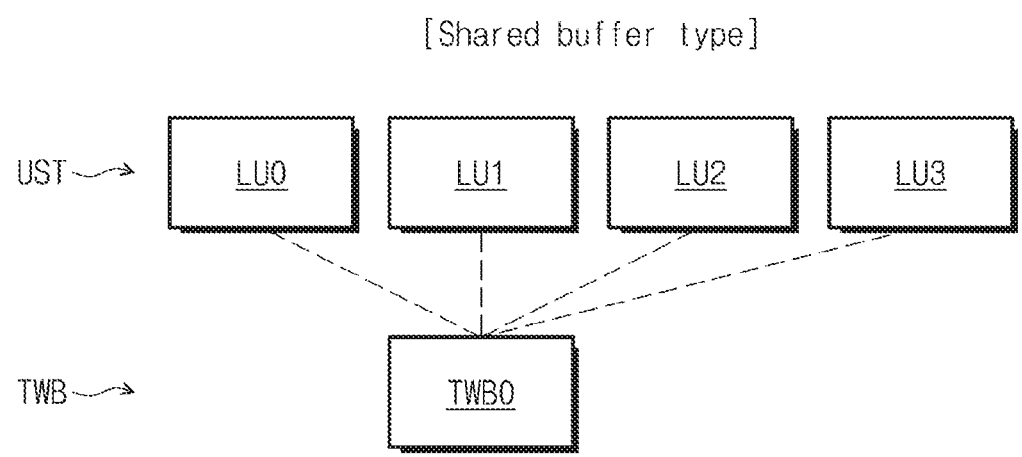

FIGS. 3A and 3B are diagrams for describing a turbo write buffer of FIG. 2. Referring to FIGS. 1, 2, 3A, and 3B, the storage device 1200 may include first, second, third and fourth logical units LU1, LU2, LU3 and LU4. Each of the first to fourth logical units LU1 to LU4 may be an externally addressable, independent, processing entity that processes a command from the host 1100. The host 1100 may manage the storage space of the storage device 1200 through the first to fourth logical units LU1 to LU4. Each of the first to fourth logical units LU1 to LU4 may be used to store data at the storage device 1200.

Each of the first to fourth logical units LU1 to LU4 may be associated with at least one memory block of the nonvolatile memory device 1220. Various kinds of logical units that are used for various purposes may exist. However, the first to fourth logical units LU1 to LU4 may correspond to the physical storage space PS and may be used to store data of the host 1100.

The first to fourth logical units LU1 to LU4 are illustrated in FIGS. 3A and 3B, but the inventive concept is not limited thereto. For example, the storage device 1200 may further include other logical units for storing and managing user data, as well as the first to fourth logical units LU1 to LU4. Alternatively, the storage device 1200 may further include other logical units for supporting various functions, as well as the first to fourth logical units LU1 to LU4.

The turbo write buffer TWB of the storage device 1200 may be configured in various types. The turbo write buffer TWB may be configured in one of a logical unit (LU) dedicated buffer type and a shared buffer type.

In the case of the LU dedicated buffer type, the turbo write buffer TWB may be configured independently or individually for each logical unit LU. For example, as illustrated in FIG. 3A, in the LU dedicated buffer type, a first turbo write buffer TWB1 may be configured with respect to the first logical unit LU1 of the first to fourth logical units LU1 to LU4, and a third turbo write buffer TWB3 may be configured with respect to the third logical unit LU3 of the first to fourth logical units LU1 to LU4.

In the LU dedicated buffer type of FIG. 3A, in the case where the write command for the first logical unit LU1 is received after the turbo write is enabled, the write data may be preferentially written in the first turbo write buffer TWB1 corresponding to the first logical unit LU1. In the case where the write command for the third logical unit LU3 is received after the turbo write function is enabled, the write data may be preferentially written in the third turbo write buffer TWB3 corresponding to the third logical unit LU3.

In the case where there are received write commands for the second and fourth logical units LU2 and LU4 to which the turbo write buffers TWB are not assigned, the write data may be written in the user storage UST corresponding to the second and fourth logical units LU2 and LU4. In addition, in the case where the write command for the first logical unit LU1 or the third logical unit LU3 is received after the turbo write is disabled, depending on the normal write policy, the write data may be written in the user storage UST of the first logical unit LU1 or the first turbo write buffer TWB1 or may be written in the user storage UST of the third logical unit LU3 or the third turbo write buffer TWB3.

In an exemplary embodiment of the inventive concept, capacities of the first and third turbo write buffers TWB1 and TWB3 may be set independently of each other. However, the inventive concept is not limited thereto. For example, the number of logical units to which turbo write buffers are respectively assigned, a capacity of each turbo write buffer, etc., may be variously changed or modified.

In an exemplary embodiment of the inventive concept, a size of the turbo write buffer TWB for each logical unit may be set to a turbo write buffer size field per unit (e.g., "dLUNumTurboWriteBufferAllocUnits") of a unit descriptor. In an exemplary embodiment of the inventive concept, the turbo write buffer size field per unit (e.g., "dLUNumTurboWriteBufferAllocUnits") may be a configurable parameter.

In the case of the shared buffer type, one turbo write buffer may be configured with respect to all the logical units. For example, as illustrated in FIG. 3B, in the shared buffer type, there may be configured one turbo write buffer TWB0 shared by all the first to fourth logical units LU1 to LU4.

In this case, when a write command for each of the first to fourth logical units LU1 to LU4 is received after the turbo write function is enabled, the write data may be first written in the shared turbo write buffer TWB0. In the case where the write command for each of the first to fourth logical units LU1 to LU4 is received after the turbo write is disabled, the write data may be written in each of the first to fourth logical units LU1 to LU4 or in the shared turbo write buffer TWB0 according to the normal write policy.

As described above, the storage device 1200 may include the turbo write buffer TWB for supporting the turbo write function. Depending on a buffer type (e.g., the LU dedicated buffer type or the shared buffer type), the turbo write buffer TWB may be configured with respect to each of a plurality of logical units or one turbo write buffer TWB may be configured to be shared by all of the logical units.

Figure 4A:
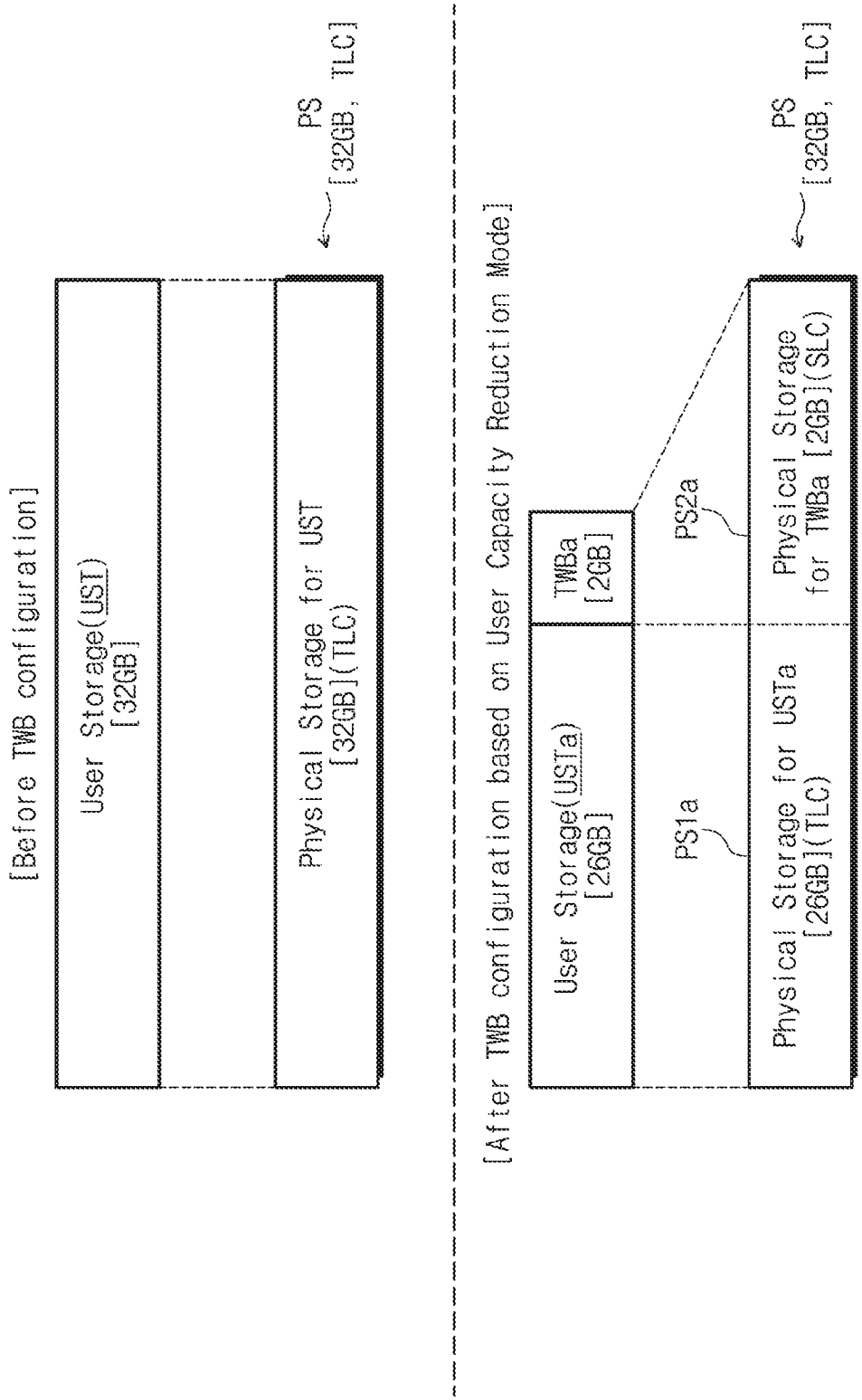
FIGS. 4A and 4B are diagrams for describing modes to configure a turbo write buffer of the storage device of FIG. 1 according to an exemplary embodiment of the inventive concept.
Figure 4B:
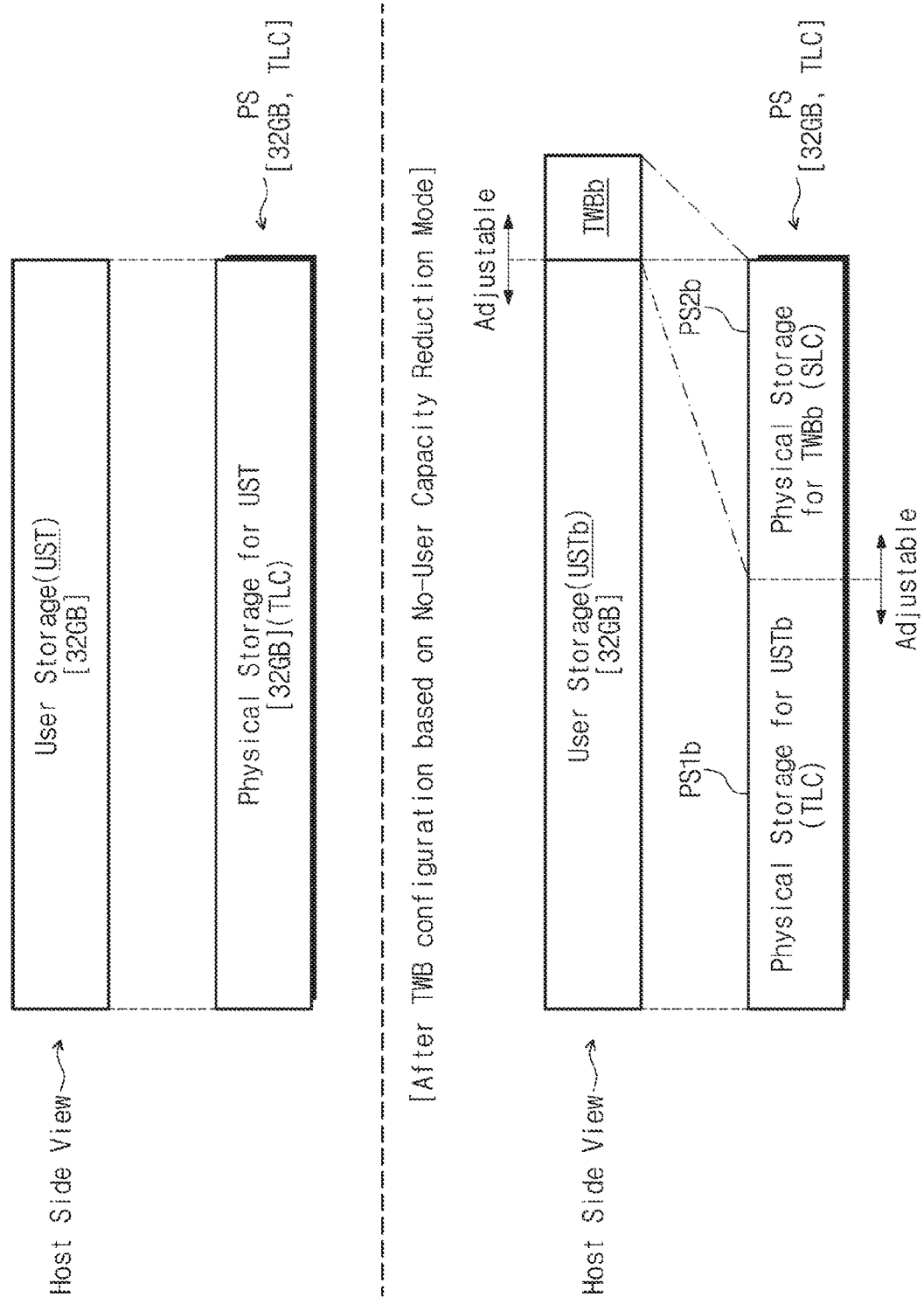

FIGS. 4A and 4B are diagrams for describing modes to configure a turbo write buffer of a storage device of FIG. 1. Below, for convenience of description, it is assumed that the physical storage space PS of the storage device 1200 is 32 GB on the basis of the TLC. In other words, in the case where each memory cell included in the storage device 1200 stores 3-bit data, the storage device 1200 may store user data of 32 GB.

However, the inventive concept is not limited thereto. For example, the physical storage space PS of the storage device 1200 may be variously changed depending on a scheme to implement the storage device 1200 or the nonvolatile memory device 1220, for example, depending on a memory cell type (e.g., SLC, MLC, TLC, or QLC), the number of memory cells, a memory cell structure, an overprovisioning ratio, etc.

Referring to FIGS. 1, 4A, and 4B, the storage device 1200 may configure a physical storage space of the turbo write buffer TWB depending on various modes. For example, the storage device 1200 may configure a physical storage space of a turbo write buffer based on one of a user capacity reduction mode and a no user capacity reduction mode.

The user capacity reduction mode may be a mode to reduce a user capacity of user storage USTa for the purpose of configuring a turbo write buffer TWBa. For example, as illustrated in FIG. 4A, the physical storage space PS of the storage device 1200 may be 32 GB on the basis of the TLC.

Before the turbo write buffer TWB is configured, the capacity of 32 GB (e.g., the entire capacity of the physical storage space PS) may be assigned to the user storage UST or may be used for the user storage UST. In this case, the user storage UST may be recognized to be 32 GB from a point of view of the host 1100.

The turbo write buffer TWB may be configured depending on the user capacity reduction mode. In this case, a second physical storage space PS2a, which is a portion of the physical storage space PS, may be assigned to a turbo write buffer TWBa or may be used for the turbo write buffer TWBa.

In addition, a first physical storage space PS1a, which is a portion of the physical storage space PS, may be assigned to the user storage USTa or may be used for the user storage USTa. In this case, compared with the case where the turbo write buffer TWBa is not configured, the capacity of the user storage USTa may decrease (e.g., from 32 GB to 26 GB) from a point of view of the host 1100.

In an exemplary embodiment of the inventive concept, the first physical storage space PS1a corresponding to the user storage USTa may be implemented with the TLC, and the second physical storage space PS2a corresponding to the turbo write buffer TWBa may be implemented with the SLC. A ratio of capacities when the same storage space is used as the TLC and the SLC may be "3:1".

In other words, when the size of the turbo write buffer TWBa increases as much as 1 GB, a size of a logical storage space of the user storage USTa may decrease as much as 3 GB. As described above, in the case where the turbo write buffer TWBa is configured in the user capacity reduction mode, a portion of the physical storage space PS of the storage device 1200 may be assigned for the turbo write buffer TWBa, and thus, a capacity of the user storage USTa identified by the host 1100 may be decreased.

In an exemplary embodiment of the inventive concept, the first physical storage space PS1a corresponding to the user storage USTa and the second physical storage space PS2a corresponding to the turbo write buffer TWBa may be physically adjacent to each other or may be physically spaced from each other.

The nouser capacity reduction mode may be a mode in which a logical storage capacity of user storage USTb recognized by the host 1100 is not reduced even though a turbo write buffer TWBb is configured. For example, as illustrated in FIG. 4B, before the configuration of the turbo write buffer TWB, the user storage UST may have the capacity of 32 GB. In other words, the physical storage space PS of the storage device 1200 may be assigned to the user storage UST or may be used for the user storage UST.

In the case where the turbo write buffer TWB is configured based on the nouser capacity reduction mode, the turbo write buffer TWBb having a particular capacity (e.g., 2 GB) may be configured. A second physical storage space PS2b, which is a portion of the physical storage space PS, may be assigned to the turbo write buffer TWBb or may be used for the turbo write buffer TWBb.

Unlike the user capacity reduction mode, the user storage USTb in the nouser capacity reduction mode may maintain the capacity of 32 GB. In other words, in the nouser capacity reduction mode, even though the turbo write buffer TWBb is configured, the capacity of the user storage UST identified from a point of view of the host 1100 may be identical to that before the configuration of the turbo write buffer TWBb.

In an exemplary embodiment of the inventive concept, in the nouser capacity reduction mode, a size or configuration of the turbo write buffer TWBb may be varied by an internal policy of the storage device 1200 or an explicit request from the host 1100. For example, because the second physical storage space PS2b, which is a portion of the physical storage space PS, is used to configure the turbo write buffer TWBb, the first physical storage space PS1b to be used for the user storage USTb may be smaller than a capacity of the user storage USTb.

In other words, in the case where the entire first physical storage space PS1b is used to store user data or an available free capacity of the first physical storage space PS1b is equal to or smaller than a reference value, all or a portion of the second physical storage space PS2b used for the turbo write buffer TWBb may be returned to the user storage USTb.

In other words, in the physical storage space PS, in the case where the turbo write buffer TWBb cannot be maintained due to a lack of the available space for the user storage USTb, the second physical storage space PS2b assigned for the turbo write buffer TWBb may be returned to the user storage USTb. The above-described return operation may be performed, for example, through a user data flush operation and an operation of setting a turbo write buffer size.

In an exemplary embodiment of the inventive concept, the host 1100 may check a current available size of the turbo write buffer TWB of the storage device 1200. For example, the storage device 1200 may set information about a current size of the turbo write buffer TWB at a current turbo write buffer size field (e.g., "dCurrentTurboWriteBufferSzie") of attributes. In addition, the storage device 1200 may set information about a ratio of a current available capacity of the turbo write buffer TWB at an available turbo write buffer size field (e.g., "dAvailableTurboWriteBufferSize") thereof.

The host 1100 may check a current available size of the turbo write buffer TWB by checking the current turbo write buffer size field and the available turbo write buffer size field of the attributes. Based on the checked information, the host 1100 may change a policy to use the turbo write or may return a physical storage space used for the turbo write buffer TWB to the user storage UST.

As another example, the storage device 1200 may autonomously return a physical storage space used for the turbo write buffer TWB to the user storage UST. For example, the storage device 1200 could periodically compare the available space of the user storage UST against a reference value to determine whether it needs to return the physical storage space used for the turbo write buffer TWB to the user storage UST. The storage device 1200 may set a status flag to indicate the turbo write buffer TWB is no longer available when it has returned the physical storage space used for the turbo write buffer TWB to the user storage UST. The status flag may be stored in a register in the storage device 1200. The host 1100 may check a changed status of the turbo write buffer TWB through the current turbo write buffer size field. The storage device 1200 could set the current turbo write buffer size field to 0 upon returning the physical storage space used for the turbo write buffer TWB to the user storage UST.

In an exemplary embodiment of the inventive concept, the storage device 1200 may provide information about a lifetime of the turbo write buffer TWB based on the number of program/erase (P/E) cycles of a physical storage space (or a memory block) assigned or used for the turbo write buffer TWB. For example, the storage device 1200 may set information about a lifetime of the turbo write buffer TWB at a turbo write buffer lifetime estimation field (e.g., "dTurboWriteBufferLifeTimeEst") of the attributes.

The host 1100 may estimate the lifetime of the turbo write buffer TWB by checking the turbo write buffer lifetime estimation field of the attributes of the storage device 1200 through a query request. In an exemplary embodiment of the inventive concept, in the nouser capacity reduction mode, because the user storage UST and the turbo write buffer TWB share the physical storage space PS, in the case where a write operation is performed on the user storage UST, the lifetime of the turbo write buffer TWB may decrease.

Figure 5:
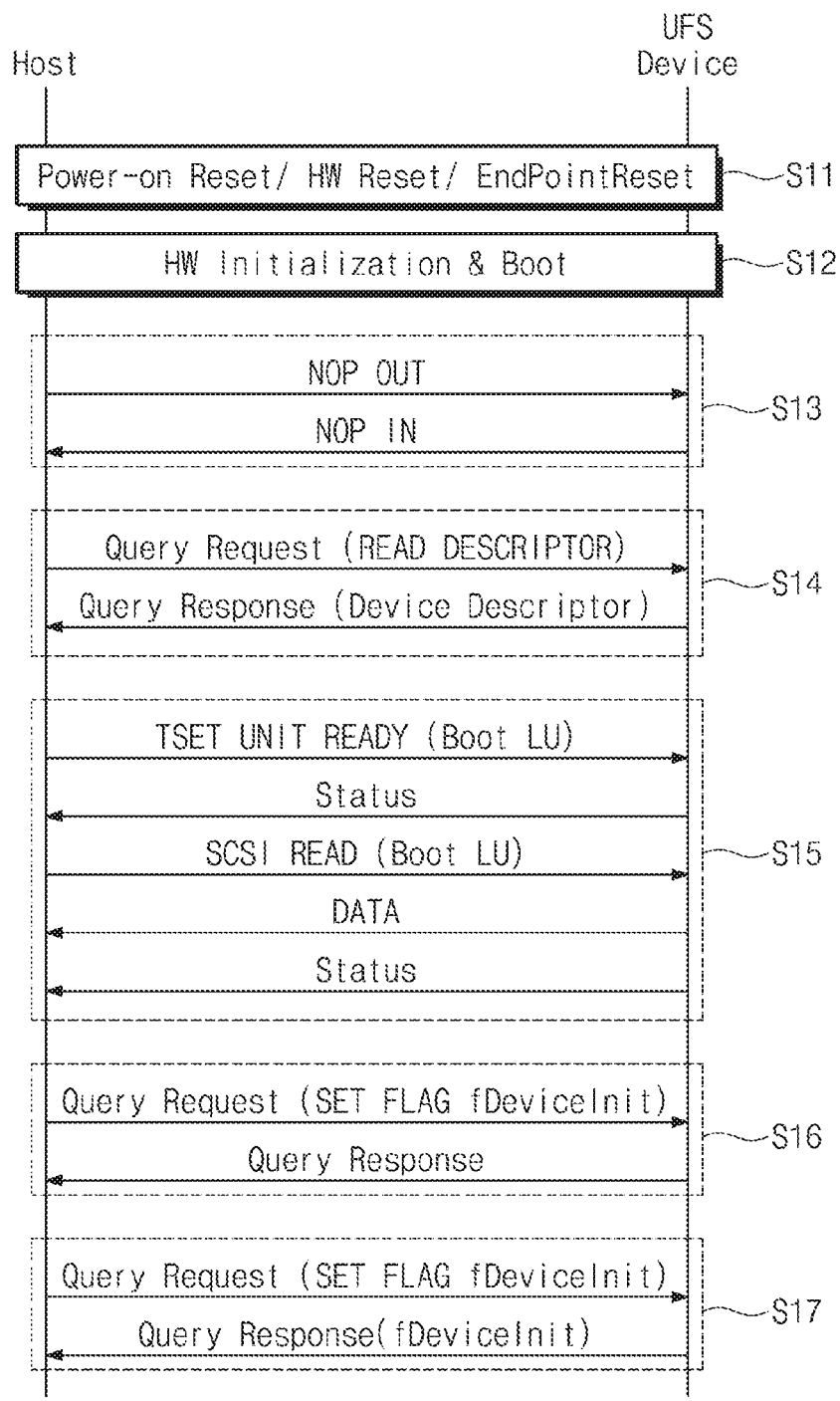
FIG. 5 is a flowchart illustrating an operation of a storage system of FIG. 1 according to an exemplary embodiment of the inventive concept.

FIG. 5 is a flowchart illustrating an operation of a storage system of FIG. 1. An initialization operation of the storage system 1000 is described with reference to FIG. 5. Referring to FIGS. 1, 2, and 5, in operation S11, the host 1100 and the storage device 1200 may perform an operation such as a power-on reset operation, a hardware reset operation, or an endpoint reset operation.

In operation S12, the host 1100 and the storage device 1200 may perform hardware reset and booting. For example, hardware layers of each of the host 1100 and the storage device 1200 may be initialized and booted.

In operation S13, the host 1100 and the storage device 1200 may perform initialization on a particular layer (e.g., an UFS transport (UTP) layer). For example, the host 1100 may transfer the NOP OUT UPIU to the storage device 1200. The storage device 1200 may transfer the NOP IN UPIU to the host 1100 in response to the NOP OUT UPIU.

In operation S14, the host 1100 may check a device descriptor from the storage device 1200. For example, the host 1100 may transfer a query request for reading a descriptor to the storage device 1200. The storage device 1200 may transfer a query response, which includes the device descriptor, to the host 1100 in response to the query request. The query request may include a read descriptor. For example, the read descriptor may indicate to the storage device 1200 that an external device desires the device descriptor.

In an exemplary embodiment of the inventive concept, the host 1100 may check a configuration and a function of the storage device 1200 through the device descriptor. For example, the device descriptor may include an extended UFS function support field (e.g., "dExtendedUFSFeaturesSupport") including information about whether to support the turbo write function. In an exemplary embodiment of the inventive concept, the information about whether to support the turbo write function may be set to a particular bit (e.g., bit[8]) of the extended UFS function support field.

The device descriptor may further include a turbo write buffer nouser space reduction enable field (e.g., "bTurboWriteBufferNoUserSpaceReductionEn") including information about a turbo write buffer mode. In the case where a value of the turbo write buffer nouser space reduction enable field is "00h", the turbo write buffer TWB may be configured depending on the user capacity reduction mode described with reference to FIG. 4A. In the case where a value of the turbo write buffer nouser space reduction enable field is "01h", the turbo write buffer TWB may be configured depending on the nouser capacity reduction mode described with reference to FIG. 4B.

The device descriptor may further include a turbo write buffer type field (e.g., "bTurbowriteBufferType") including information about a turbo write buffer type. In the case where a value of the turbo write buffer type field is "00h", the turbo write buffer TWB may be configured depending on the LU dedicated buffer type described with reference to FIG. 3A. In the case where a value of the turbo write buffer type field is "01h", the turbo write buffer TWB may be configured depending on the shared buffer type described with reference to FIG. 3B.

The device descriptor may further include a shared turbo write buffer allocation number field (e.g., "dNumSharedTurboWriteBufferAllocUnits") including information about a size of a turbo write buffer. In the case where the number of units assigned to a shared turbo write buffer is set to "0", a turbo write buffer of the shared buffer type may not be configured.

The above-described fields are merely exemplary, and the inventive concept is not limited thereto. For example, the device descriptor may further include other fields including information about a configuration, a structure, a function, etc., of the storage device 1200, as well as the above-described fields. Various fields of the device descriptor may indicate values that are set before the initialization operation. The host 1100 may identify a current status of the storage device 1200 by reading various fields of the device descriptor.

In an exemplary embodiment of the inventive concept, the above-described fields of the device descriptor, such as "bTurboWriteBufferNoUserSpaceReductionEn", "bTurboWriteBufferType", and "dNumSharedTurboWriteBufferAllocUnits", may be varied by writing a value of a corresponding field of a configuration descriptor. In other words, the host 1100 may vary information such as a turbo write buffer type, turbo write buffer nouser space reduction enable, and the number of units assigned to a turbo write buffer, by writing values of various fields of the configuration descriptor. In an exemplary embodiment of the inventive concept, a geometry descriptor of the storage device 1200 may include information such as a turbo write buffer maximum size field, a turbo write buffer maximum number field, a turbo write buffer capacity adjustment factor field, a supported turbo write buffer nouser capacity reduction type field, a supported turbo write buffer type field, etc.

For example, the turbo write buffer maximum size field (e.g., "dTurboWriteBufferMaxNAllocUnits") may include information about a maximum size of the turbo write buffer TWB supported at the storage device 1200. The turbo write buffer maximum number field (e.g., "bDeviceMaxTurboWriteLUs") may include information about the maximum number of turbo write buffers supported at the storage device 1200.

The turbo write buffer capacity adjustment factor field (e.g., "bTurboWriteBufferCapAdjFac") may include information about a capacity reduction factor according to a kind of turbo write buffer memory. For example, in the case where the turbo write buffer TWB is implemented with the SLC and the user storage UST is implemented with the TLC, a value of the turbo write buffer capacity adjustment factor field may be "3". In the case where the turbo write buffer TWB is implemented with the SLC and the user storage UST is implemented with the MLC, a value of the turbo write buffer capacity adjustment factor field may be "2".

The supported turbo write buffer nouser capacity reduction type field (e.g., "bSupportedTurboWriteBufferNoUserSpaceReductionTypes") may include information about whether the storage device 1200 supports any turbo write buffer mode (e.g., the user capacity reduction mode, the nouser capacity reduction mode, or both).

The supported turbo write buffer type field (e.g., "bSupportedTurboWriteBufferTypes") may include information about whether the storage device 1200 supports any turbo write buffer type (e.g., the LU dedicated buffer type, the shared buffer type, or both).

The above-described fields are merely exemplary, and the inventive concept is not limited thereto.

In operation S15, the host 1100 may download a boot code from the storage device 1200. For example, the host 1100 may transfer the TEST UNIT READY UPIU to the storage device 1200. The storage device 1200 may transfer status information in response to the received TEST UNIT READY UPIU. The host 1100 may determine whether a boot logical unit (or a boot well-known LU) of the storage device 1200 is accessible, based on the received status information.

In the case where the boot logical unit is accessible, the host 1100 may transfer a SCSI READ command to the storage device 1200. In an exemplary embodiment of the inventive concept, the SCSI READ command may correspond to the boot logical unit. The storage device 1200 may transfer data "DATA" and status information to the host 1100 in response to the received command.

In operation S16, the host 1100 may complete the initialization operation by setting a flag of the storage device 1200. For example, the host 1100 may transfer the query request to the storage device 1200. The query request may be a request for setting a device initialization field (e.g., "fDeviceInit") included in the flag of the storage device 1200. In response to the query request, the device initialization field included in the flag of the storage device 1200 may be set to a particular value (e.g., "01h"). Afterwards, the storage device 1200 may transfer a query response.

In operation S17, the host 1100 may poll the device initialization field (e.g., "fDeviceInit") of the flag of the storage device 1200. For example, the host 1100 may transfer a query request for reading the device initialization field of the flag to the storage device 1200, and the storage device 1200 may transfer a query response, in which the device initialization field is included, to the host 1100.

In an exemplary embodiment of the inventive concept, after operation S16, in the case where the initialization operation of the storage device 1200 is completed, the device initialization field may be reset to a different value (e.g., "00h"). In other words, the host 1100 may repeatedly perform operation S17 to check whether the device initialization field is reset. In the case where the device initialization field is reset, the initialization operation of the host 1100 and the storage device 1200 may be completed.

Figure 6:
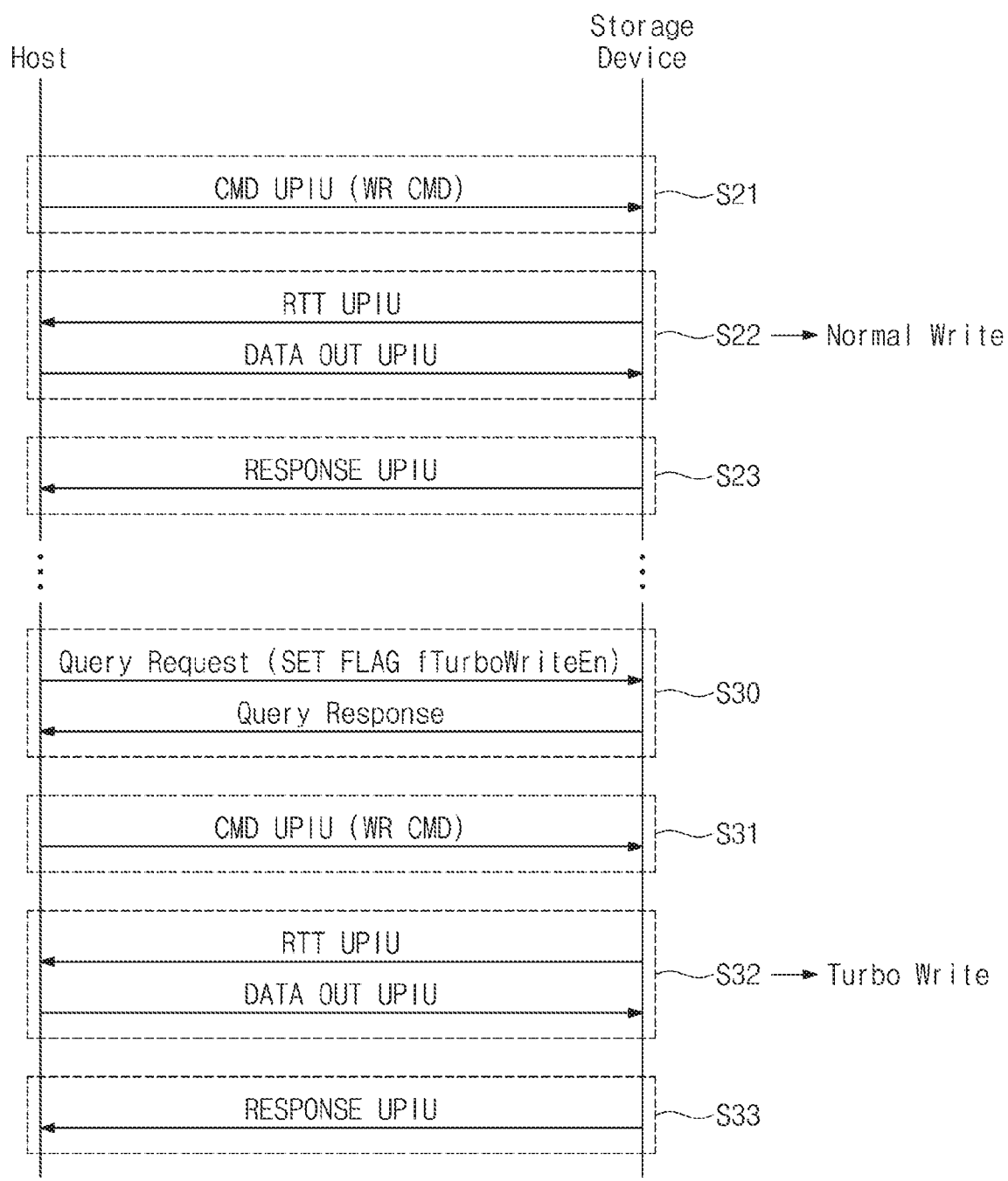
FIG. 6 is a flowchart illustrating an operation of a storage system of FIG. 1 according to an exemplary embodiment of the inventive concept.

FIG. 6 is a flowchart illustrating an operation of a storage system of FIG. 1. A write operation of the storage system 1000 will be described with reference to FIG. 6. Referring to FIGS. 1 and 6, in operation S21, the host 1100 may transfer a CMD UPIU including a write command WR CMD to the storage device 1200.

In operation S22, the host 1100 and the storage device 1200 may perform data transaction. For example, the storage device 1200 may transfer a ready to transfer UPIU (RTT UPIU) to the host 1100. The RTT UPIU may include information about a data range where the storage device 1200 is able to receive data. The host 1100 may transfer a DATA OUT UPIU including the write data to the storage device 1200 in response to the RTT UPIU. As the above-described operation is repeatedly performed, the write data may be transferred from the host 1100 to the storage device 1200.

After all of the write data are received, in operation S23, the storage device 1200 may transfer a RESPONSE UPIU to the host 1100. The RESPONSE UPIU may include information indicating that an operation corresponding to the write command received in operation S21 is completed.

In an exemplary embodiment of the inventive concept, the storage device 1200 may perform a normal write operation on the write data received in operation S22. For example, in operation S21, the storage device 1200 may determine whether the turbo write function is enabled. More specifically, the storage device 1200 may determine whether the turbo write function is enabled, based on a value of a turbo write enable field (e.g., "fTurboWriteEn") of the flag.

In the case where a value of the turbo write enable field is "0b", the turbo write function may be in a disabled state. In the case where a value of the turbo write enable field is "1b", the turbo write function may be in an enabled state. In an exemplary embodiment of the inventive concept, a value of the turbo write enable field of the flag may be set by a query request for a set flag of the host 1100.

A value of the turbo write enable field may not be set by the host 1100. In this case, the write data received in operation S22 may be written in the turbo write buffer TWB or the user storage UST in compliance with the normal write policy.

In operation S30, the host 1100 may set a value of the turbo write enable field to a particular value (e.g., "1b"). For example, the host 1100 may transfer a query request for setting a value of the turbo write enable field to a particular value (e.g., "1b") to the storage device 1200. A value of the turbo write enable field may be set to a particular value (e.g., "1b") in response to the query request from the host 1100, and the storage device 1200 may transfer a query response to the host 1100.

Afterwards, the host 1100 may perform operation S31 to operation S33. Operation S31 to operation S33 may be similar to operation S21 to operation S23 except that the turbo write is performed depending on the turbo write enable field, and thus, additional description will be omitted to avoid redundancy.

In an exemplary embodiment of the inventive concept, the write data received in operation S32 may be written in the turbo write buffer TWB. For example, in operation S30, as a value of the turbo write enable field is set to a particular value (e.g., "1b"), the turbo write function may be enabled. In this case, the write data received from the host 1100 may be written in the turbo write buffer TWB. For example, in operation S31, the data received from the host 1100 may be stored in the pinned turbo write buffer TWB-p or the non-pinned turbo write buffer TWB-np depending on a particular factor value of the command UPIU. How to configure a turbo write buffer divided into the pinned turbo write buffer TWB-p and the non-pinned turbo write buffer TWB-np will be more fully described with reference to FIG. 8.

In an exemplary embodiment of the inventive concept, even though the turbo write function is enabled, in the case where a space of the turbo write buffer TWB is insufficient, the storage device 1200 may write the received write data in the user storage UST.

Figure 7:
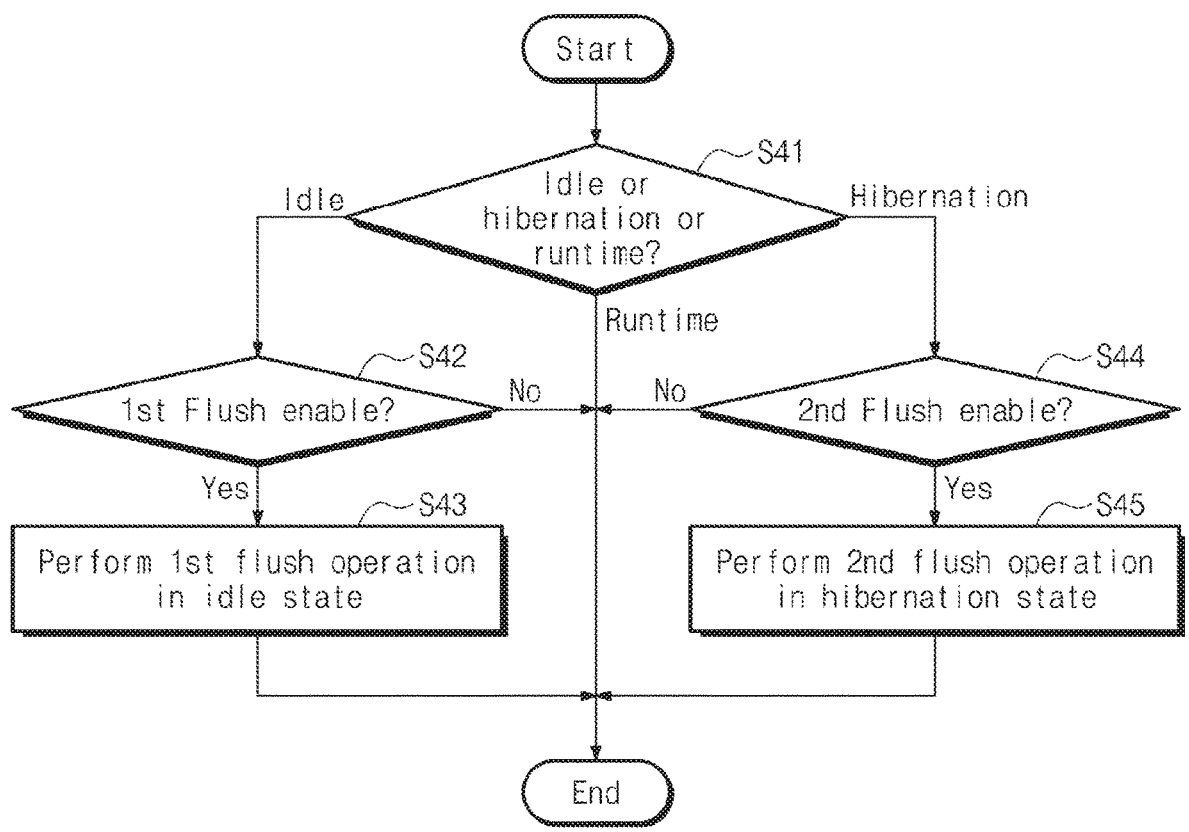
FIG. 7 is a flowchart illustrating an operation of a storage device of FIG. 1 according to an exemplary embodiment of the inventive concept.

FIG. 7 is a flowchart illustrating an operation of a storage device of FIG. 1. A flush operation of the storage device 1200 will be described with reference to FIG. 7. Referring to FIGS. 1, 2, and 7, in operation S41, the storage device 1200 may determine whether a current state is an idle state, a hibernation state, or a runtime state. When the storage device 1200 is in the runtime state, a separate flush operation may not be performed.

For example, when the storage device 1200 is processing a command received from the host 1100, the storage device 1200 may be in the runtime state. When a command (e.g., a pending command) that is received from the host 1100 and is being processed or to be processed does not exist, the storage device 1200 may be in the idle state. When the storage device 1200 enters a low-power mode called "hibernation" by the initiation of the storage device 1200 or the host 1100, the storage device 1200 may be in the hibernation state.

When the storage device 1200 is in the idle state, in operation S42, whether a first flush operation is enabled may be determined. The host 1100 may allow or prohibit the first flush operation at the storage device 1200 by setting a value of a turbo write buffer flush enable field (e.g., "fTurboWriteBufferFlushEn") of the flag. The storage device 1200 may determine whether the first flush operation is enabled, by checking a value of the turbo write buffer flush enable field of the flag.

In an exemplary embodiment of the inventive concept, when a value of the turbo write buffer flush enable field of the flag is "0b", the first flush operation may be disabled or prohibited. When a value of the turbo write buffer flush enable field of the flag is "1b," the first flush operation may be enabled. In the case where the first flush operation is disabled, the storage device 1200 may not perform a separate flush operation.

In the case where the first flush operation is enabled, in operation S43, the storage device 1200 may perform the first flush operation during the idle state. The first flush operation may be a flush operation that the storage device 1200 performs in the idle state. The flush operation may be an operation of flushing or migrating user data written in the turbo write buffer TWB to the user storage UST, depending on the internal policy or the explicit command from the host 1100.

In an exemplary embodiment of the inventive concept, when the user data written in the turbo write buffer TWB are flushed to the user storage UST, a logical address of the flushed user data may be maintained, and a physical address may be changed. In this case, the storage device 1200 may update mapping information of the logical address and the physical address of the flushed user data. For example, the physical address may be changed from an address of the turbo write buffer TWB to an address of the user storage UST.

When a determination result of operation S41 indicates that the storage device 1200 is in the hibernation state, in operation S44, the storage device 1200 may determine whether a second flush operation is enabled. As in the above description, for example, the host 1100 may allow or prohibit the second flush operation at the storage device 1200 by setting a value of a turbo write buffer flush enable field during hibernation (e.g., "fTurboWriteBufferFlushDuringHibernat") of the flag.

The storage device 1200 may determine whether the second flush operation is enabled, by checking the value of the turbo write buffer flush enable field during hibernation of the flag. In an exemplary embodiment of the inventive concept, when a value of the turbo write buffer flush enable field during hibernation of the flag is "0b", the second flush operation may be disabled or prohibited. When a value of the turbo write buffer flush enable field during hibernation of the flag is "1b", the second flush operation may be enabled. In the case where the second flush operation is disabled, the storage device 1200 may not perform a separate flush operation.

In the case where the second flush operation is enabled, in operation S45, the storage device 1200 may perform the second flush operation during the hibernation state. The second flush operation may indicate a flush operation that the storage device 1200 performs in the hibernation state.

According to the above flush operation, user data written in the turbo write buffer TWB may be flushed or migrated to the user storage UST. As such, an available buffer size of the turbo write buffer TWB may be secured.

In an exemplary embodiment of the inventive concept, the above flush operation may be suspended under a particular condition. For example, the first flush operation that is performed in the idle state may be performed only in a state where a command queue of the storage device 1200 is empty. While the first flush operation is performed, in the case where a command is issued from the host 1100, the storage device 1200 may suspend the first flush operation being performed and may first process the command issued from the host 1100. In an exemplary embodiment of the inventive concept, in the case where the hibernation mode is terminated, the second flush operation that is performed in the hibernation state may be stopped.

As described above, a flush operation being performed may be suspended depending on a particular condition. In this case, the storage device 1200 may set suspension information (or information of the progress degree) or a current status of the flush operation at a turbo write buffer flush status field (e.g., "bTurboWriteBufferFlushStatus") of the attributes.

In an exemplary embodiment of the inventive concept, the storage device 1200 may set information, which indicates that a flush operation for the turbo write buffer TWB is required, to a particular value (e.g., bit[5]) of an exception event status (e.g., "dExceptionEventStatus") of the attributes. The host 1100 may check the particular value (e.g., bit[5]) of the exception event status of the attributes, may determine that a flush operation is required at the storage device 1200, and may set particular fields (e.g., "fTurboWriteBufferFlushEn" and "fTurboWriteBufferFlushDuringHibernate") of the flag of the storage device 1200 in compliance with a policy.

The description is given with reference to FIG. 7 as the storage device 1200 performs a flush operation based on a value of a flush enable field (i.e., a value of the turbo write buffer flush enable field or a value of the turbo write buffer flush enable field during hibernation), but the inventive concept is not limited thereto. In an exemplary embodiment, the storage device 1200 performs a flush or migration operation depending on an internal policy, regardless of a value of the flush enable field (i.e., a value of the turbo write buffer flush enable field or a value of the turbo write buffer flush enable field during hibernation). In this case, the storage device 1200 may perform the flush or migration operation depending a result of determination that is automatically made by the storage device 1200 (without intervention of the outside, or according to its own determination).

Figure 8:
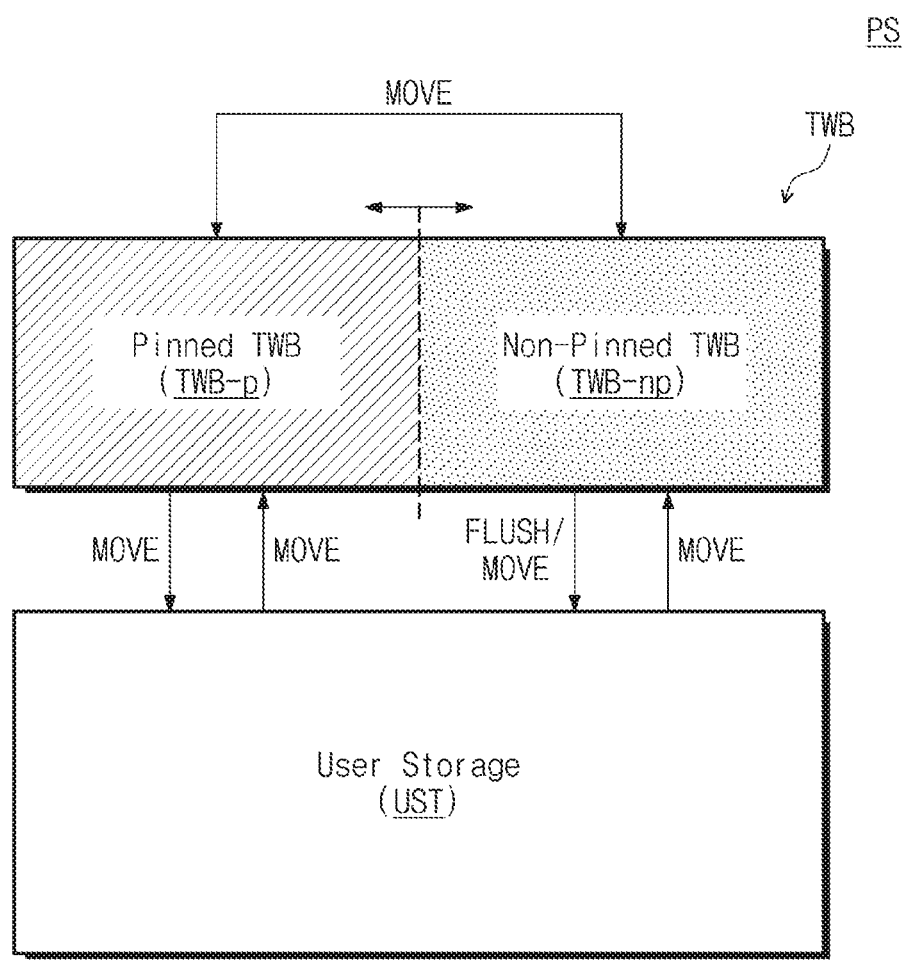
FIG. 8 is a block diagram illustrating a physical storage space of a storage device of FIG. 1 according to an exemplary embodiment of the inventive concept.

FIG. 8 is a block diagram illustrating a physical storage space of the storage device 1200 of FIG. 1. Referring to FIGS. 1 and 8, the physical storage space PS of the storage device 1200 may include the turbo write buffer TWB and the user storage UST. The physical storage space PS, the turbo write buffer TWB, and the user storage UST of the storage device 1200 are described above, and thus, additional description may be omitted to avoid redundancy.

The turbo write buffer TWB may be divided into a pinned turbo write buffer TWB-p and a non-pinned turbo write buffer TWB-np. As in the above description, in the case where the turbo write function of the storage device 1200 is enabled, the write data may be stored in one of the pinned turbo write buffer TWB-p and the non-pinned turbo write buffer TWB-np.

In an embodiment, data stored in the pinned turbo write buffer TWB-p is not targeted for a move (e.g., a migrate or a flush) to the user storage UST, and data stored in the non-pinned turbo write buffer TWB-np may be targeted for a move to the user storage UST. That is, a priority of data stored in the pinned turbo write buffer TWB-p may be higher than a priority of data stored in the non-pinned turbo write buffer TWB-np. However, the inventive concept is not limited thereto as data stored in the pinned turbo write buffer TWB-p may be targeted for a move to the non-pinned turbo write buffer TWB-np or the user storage UST depending on resources or a policy of a system. In an exemplary embodiment, a migration or flush operation is periodically performed to move data from the turbo write buffer TWB to the user storage UST. In this embodiment, all data present in the non-pinned turbo write buffer TWB-np is first migrated or flushed to the user storage UST before any data of the pinned turbo write buffer TWB-p is migrated or flushed to the user storage UST. In another embodiment, during a given migration, first data in the non-pinned turbo write buffer TWB-np is migrated to the user storage UST during a first period of the migration and second data in the pinned turbo write buffer TWB-p is migrated to the user storage UST during a second period after the first period.

One, in which the write data are to be stored, from among the pinned turbo write buffer TWB-p and the non-pinned turbo write buffer TWB-np may be determined through various schemes (e.g., an internal policy, a change of the internal policy according to a request of a host, and an explicit request of a host).

In an exemplary embodiment of the inventive concept, as described above, the size of the turbo write buffer TWB may be determined under control of the host 1100 or depending on the internal policy of the storage device 1200. In this case, a ratio of the pinned turbo write buffer TWB-p and the non-pinned turbo write buffer TWB-np in the turbo write buffer TWB may be determined or varied through various schemes (e.g., an internal policy, a change of the internal policy according to a request of a host, and an explicit request of a host).

In an exemplary embodiment of the inventive concept, user data may be flushed, migrated, or moved between the pinned turbo write buffer TWB-p, the non-pinned turbo write buffer TWB-np, and the user storage UST. For example, the user data may migrate or move between the pinned turbo write buffer TWB-p and the non-pinned turbo write buffer TWB-np depending on an explicit request of the host 1100, an internal policy of the storage device 1200, or a change of the internal policy according to a request of the host 1100.

Alternatively, the user data may migrate or move between the non-pinned turbo write buffer TWB-np and the user storage UST depending on the explicit request of the host 1100, the internal policy of the storage device 1200, or the change of the internal policy according to the request of the host 1100. For example, the user data may be flushed from the non-pinned turbo write buffer TWB-np to the user storage UST. Alternatively, the user data may migrate or move between the pinned turbo write buffer TWB-p and the user storage UST depending on the explicit request of the host 1100, the internal policy of the storage device 1200, or the change of the internal policy according to the request of the host 1100.

In an exemplary embodiment of the inventive concept, as described with reference to FIG. 7, the storage device 1200 may perform a flush operation during the idle state or the hibernation state. In this case, the storage device 1200 may perform the flush operation on the non-pinned turbo write buffer TWB-np of the turbo write buffer TWB. In other words, the storage device 1200 may flush the user data stored in the non-pinned turbo write buffer TWB-np of the turbo write buffer TWB to the user storage UST.

In this case, the user data written in the pinned turbo write buffer TWB-p may not be flushed to the user storage UST. In other words, even though the storage device 1200 performs the flush operation, the user data written in the pinned turbo write buffer TWB-p may be maintained.

As another example, depending on the internal policy of the storage device 1200, data to be stored in the non-pinned turbo write buffer TWB-np may be written in the pinned turbo write buffer TWB-p. This data may be flushed from the pinned turbo write buffer TWB-p to the user storage UST. In other words, data stored in the pinned turbo write buffer TWB-p may not be flushed by an explicit flush request from the host 1100, but may be selectively flushed to the user storage UST depending on the internal flush policy of the storage device 1200.

In an exemplary embodiment of the inventive concept, in the case where data are flushed, migrated, or moved between the pinned turbo write buffer TWB-p, the non-pinned turbo write buffer TWB-np, and the user storage UST, the controller 1210 may be configured to update a mapping relationship of the moved data. For example, in the case where data corresponding to a first logical block address is flushed or migrated from the pinned turbo write buffer TWB-p to the user storage UST, the controller 1210 may release a mapping relationship of the first logical block address and a physical address of the pinned turbo write buffer TWB-p and may update a mapping relationship of the first logical block address and a physical address of the user storage UST. The release or update of the mapping relationship may be made in a scheme similar to that described above for moving between other areas, and thus, additional description will be omitted to avoid redundancy.

Below, to explain the inventive concept more clearly, a description will be given under the assumption that data to be stored in the pinned turbo write buffer TWB-p is required to be stored in the pinned turbo write buffer TWB-p. However, the inventive concept is not limited thereto.

Accordingly, in the case where the host 1100 issues a read command for first user data written in the pinned turbo write buffer TWB-p, the first user data may be read from the pinned turbo write buffer TWB-p. In this case, it may be possible to read the first user data at a high speed.

For example, as described above, the pinned turbo write buffer TWB-p may store user data based on the SLC scheme, and the user storage UST may store user data in the TLC scheme. A time taken to read user data stored based on the SLC scheme is shorter than a time taken to read user data stored based on the TLC scheme.

In other words, as particular user data are retained in the pinned turbo write buffer TWB-p, a speed at which the particular user data are read may be improved. This function of the storage device 1200 may be called "turbo read".

In an exemplary embodiment of the inventive concept, the physical storage space PS of the storage device 1200 may indicate a storage space of the nonvolatile memory device 1220. In other words, the nonvolatile memory device 1220 may include the pinned turbo write buffer TWB-p, the non-pinned turbo write buffer TWB-np, or the user storage UST.

Figure 9:
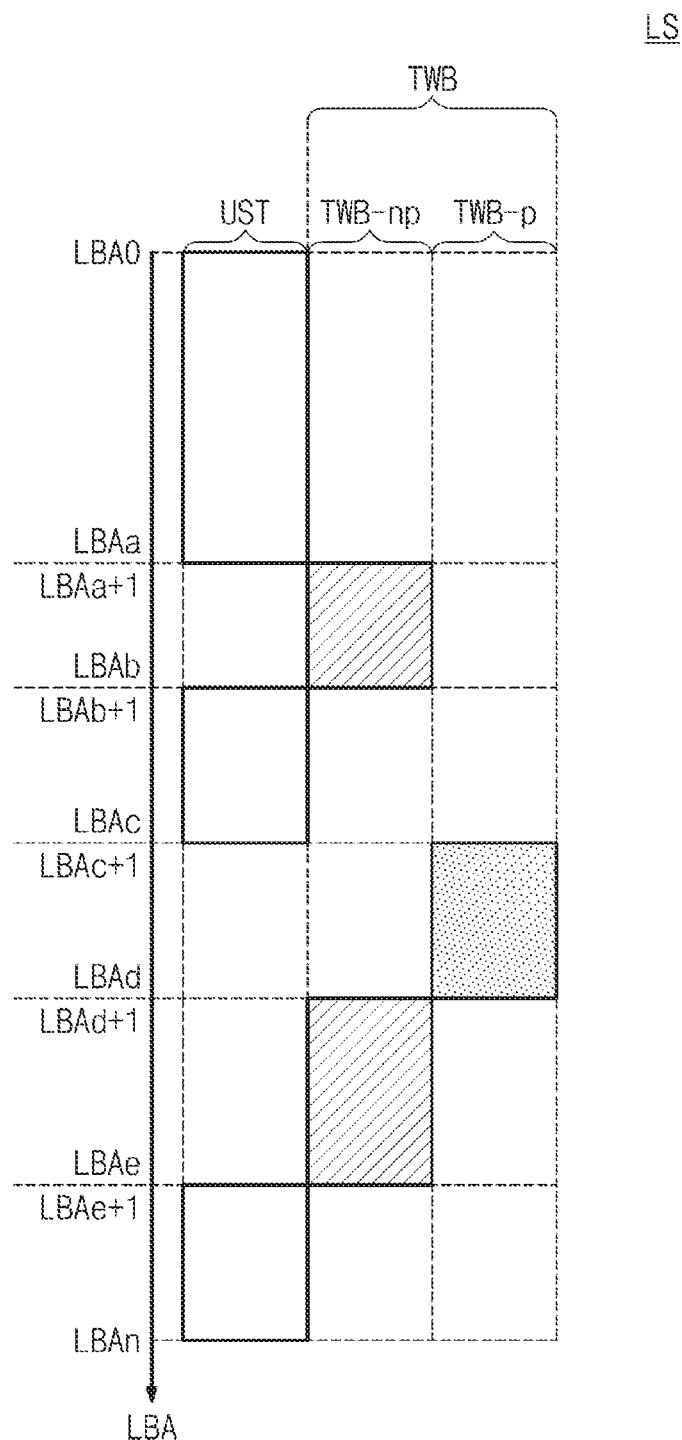
FIG. 9 is a diagram illustrating a logical storage space for a physical storage space of a storage device described with reference to FIG. 8 according to an exemplary embodiment of the inventive concept.

FIG. 9 is a diagram illustrating a logical storage space for the physical storage space PS of the storage device 1200 described with reference to FIG. 8. For convenience of description, the embodiment of FIG. 9 will be described with reference to one logical unit. However, the inventive concept may be identically applied to two or more logical units to which the turbo write buffers TWB correspond, or a relationship between logical units and a shared turbo write buffer (e.g., TWB0).

Referring to FIGS. 1 and 9, a logical storage space LS of the storage device 1200 that is identified by the host 1100 may include the user storage UST and the turbo write buffer TWB. The turbo write buffer TWB may include the pinned turbo write buffer TWB-p and the non-pinned turbo write buffer TWB-np.

A first logical block address range (e.g., LBA0 to LBAa, LBAb+1 to LBAc, and LBAe+1 to LBAn) may correspond to a logical storage space of the user storage UST. In this case, user data stored in the first logical block address range (e.g., LBA0 to LBAa, LBAb+1 to LBAc, and LBAe+1 to LBAn) may be stored in a physical storage space of the user storage UST.

A second logical block address range (e.g., LBAa+1 to LBAb and LBAd+1 to LBAe) may correspond to a logical storage space of the non-pinned turbo write buffer TWB-np. In this case, user data stored in the second logical block address range (e.g., LBAa+1 to LBAb and LBAd+1 to LBAe) may be stored in a physical storage space of the non-pinned turbo write buffer TWB-np.

A third logical block address range (e.g., LBAc+1 to LBAd) may correspond to a logical storage space of the pinned turbo write buffer TWB-p. In this case, user data stored in the third logical block address range (e.g., LBAc+1 to LBAd) may be stored in a physical storage space of the pinned turbo write buffer TWB-p.

As described above, the user storage UST, the non-pinned turbo write buffer TWB-np, and the pinned turbo write buffer TWB-p may be distributed in various forms on the logical storage space LS recognized by the host 1100. However, the inventive concept is not limited thereto and the third logical block address range may correspond to a logical storage space of the non-pinned turbo write buffer TWB-np and the second logical block address range may correspond to a logical storage space of the pinned turbo write buffer TWB-p. In an exemplary embodiment of the inventive concept, user data may be moved/flushed/migrated between the user storage UST, the non-pinned turbo write buffer TWB-np, and the pinned turbo write buffer TWB-p, depending on the explicit request of the host 1100 or the internal policy of the storage device 1200.

For example, the host 1100 may specify one of the pinned turbo write buffer TWB-p and the non-pinned turbo write buffer TWB-np in the turbo write. As another example, the host 1100 may specify one of the pinned turbo write buffer TWB-p and the non-pinned turbo write buffer TWB-np as a turbo write target before the turbo write. As yet another example, the host 1100 may not specify the pinned turbo write buffer TWB-p or the non-pinned turbo write buffer TWB-np in the turbo write.

The host 1100 may check a distribution state of data changed by the storage device 1200 by requesting (e.g., using the Query UPIU) information of the pinned turbo write buffer TWB-p and the non-pinned turbo write buffer TWB-np from the storage device 1200 periodically or if necessary.

Figure 10A:
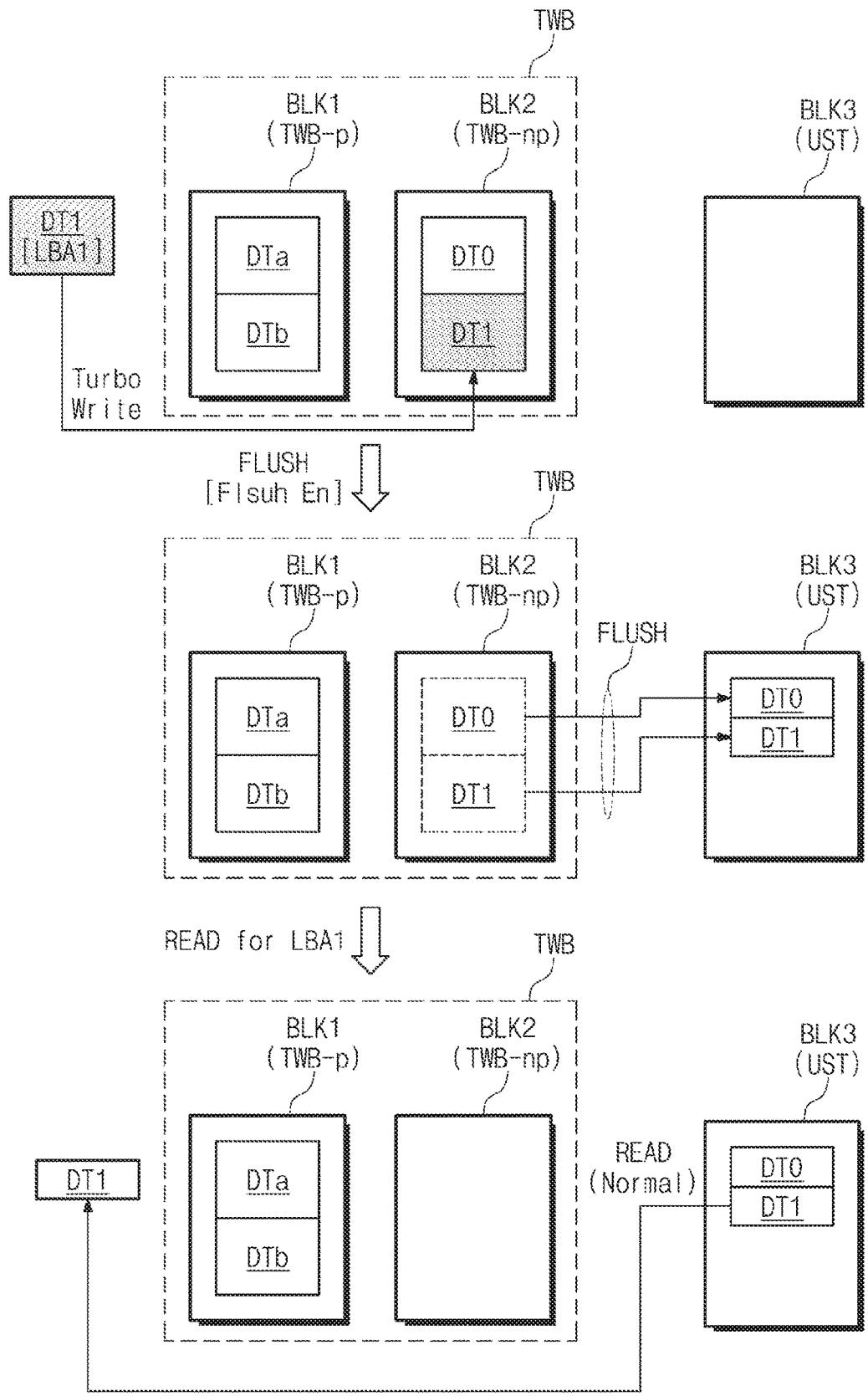
FIGS. 10A and 10B are diagrams illustrating an operation in a physical storage space of a storage device described with reference to FIG. 8 according to an exemplary embodiment of the inventive concept.
Figure 10B:
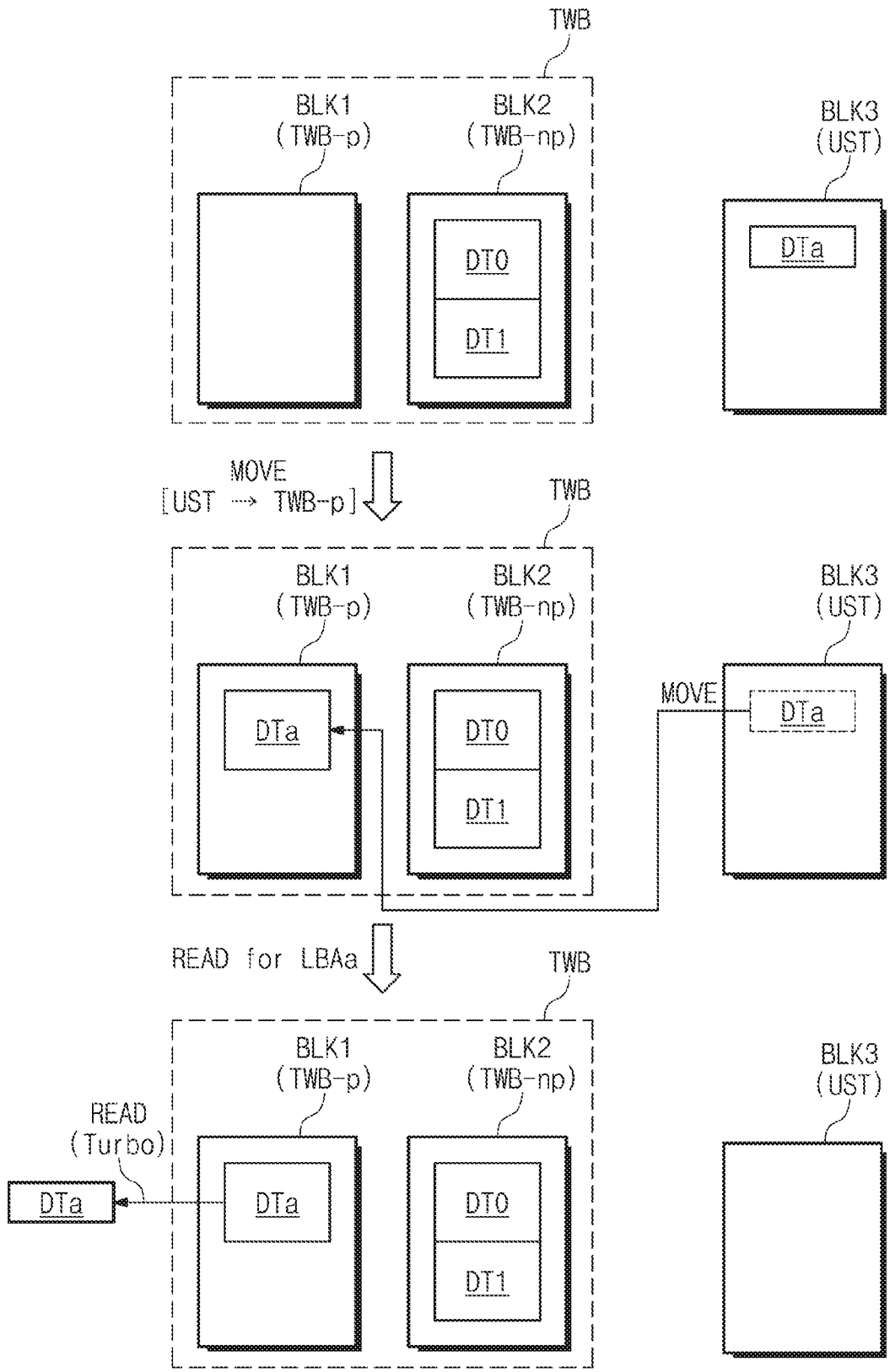

FIGS. 10A and 10B are diagrams illustrating an operation in a physical storage space of a storage device described with reference to FIG. 8. For brevity of illustration and convenience of description, it is assumed that the pinned turbo write buffer TWB-p includes a first memory block BLK1, the non-pinned turbo write buffer TWB-np includes a second memory block BLK2, and the user storage UST may include a third memory block BLK3. However, the inventive concept is not limited thereto.

Referring to FIGS. 1, 8, and 10A, the storage device 1200 may receive first data DT1 corresponding to a first logical block address LBA1 from the host 1100. In an exemplary embodiment of the inventive concept, the turbo write function of the storage device 1200 may be in an enabled state. In this case, the storage device 1200 may write the received first data DT1 in the turbo write buffer TWB (e.g., the non-pinned turbo write buffer TWB-np).

In other words, the storage device 1200 may perform the turbo write on the first data DT1. In an exemplary embodiment of the inventive concept, in the case where the turbo write function is enabled, whether to store data in any one of the pinned turbo write buffer TWB-p and the non-pinned turbo write buffer TWB-np may be determined through various schemes.

In an exemplary embodiment of the inventive concept, as illustrated in FIG. 10A, the pinned turbo write buffer TWB-p and the non-pinned turbo write buffer TWB-np may be full of user data DTa, DTb, DT0, and DT1. In this case, the storage device 1200 may notify the host 1100 that a flush operation is required, by setting a particular bit (e.g., bit[5]) of an exception event status field (e.g., "wExceptionEventStatus") of the attributes.

The host 1100 may check the exception event status field of the attributes through a query request and may check that the flush operation is required at the storage device 1200. The host 1100 may allow the flush operation of the storage device 1200 by setting the turbo write buffer flush enable field or the turbo write buffer flush enable field during hibernation of the flag of the storage device 1200 as described with reference to FIG. 7.

When the flush function is allowed (or enabled) under control of the host 1100, the storage device 1200 may perform the flush operation. For example, in the idle state or the hibernation state, the storage device 1200 may flush the user data DT0 and DT1 stored in the non-pinned turbo write buffer TWB-np to the third memory block BLK3 of the user storage UST. In an exemplary embodiment of the inventive concept, even though the flush operation is allowed under control of the host 1100, the user data DTa and DTb stored in the pinned turbo write buffer TWB-p may not be flushed to the user storage UST. In other words, the user data DTa and DTb stored in the pinned turbo write buffer TWB-p remains while the user data DT0 and DT1 stored in the non-pinned turbo write buffer TWB-np is flushed.

Afterwards, the storage device 1200 may receive a read command for the first logical address LBA1 from the host 1100. In this case, the storage device 1200 may read the first data DT1 stored in the third memory block BLK3 of the user storage UST and may output the read first data DT1 to the host 1100.

In an exemplary embodiment of the inventive concept, because the first data DT1 are written (e.g., SLC programmed) in the non-pinned turbo write buffer TWB-np but the first data DT1 are flushed to the user storage UST due to the flush operation, the first data DT1 may be read through a normal read operation (e.g., a TLC read operation). In other words, the first data DT1 may be SLC programmed but TLC read.

Referring to FIGS. 1, 8, and 10B, the 0-th and first data DT0 and DT1 may be stored in the second memory block BLK2 of the non-pinned turbo write buffer TWB-np, and the a-th data DTa may be stored in the third memory block BLK3 of the user storage UST.

Afterwards, depending on the explicit request of the host 1100 or the internal policy of the storage device 1200, the a-th data DTa of the user storage space UST may move to the first memory block BLK1 of the pinned turbo write buffer TWB-p. For example, the storage device 1200 may read the a-th data DTa from the third memory block BLK3 of the user storage UST and may store the read a-th data DTa in the first memory block BLK1 of the pinned turbo write buffer TWB-p. Afterwards, the a-th data DTa stored in the third memory block BLK3 of the user storage UST may be invalidated, deleted, or unmapped. In an exemplary embodiment of the inventive concept, even though the a-th data DTa are invalidated, deleted, or unmapped, an a-th logical block address LBAa corresponding to the a-th data DTa may maintain mapping with the first memory block BLK1 of the pinned turbo write buffer TWB-p.

Afterwards, the storage device 1200 may receive a read command for the a-th logical block address LBAa corresponding to the a-th data DTa from the host 1100. In this case, the storage device 1200 may read the a-th data DTa stored in the first memory block BLK1 of the pinned turbo write buffer TWB-p and may transfer the read a-th data DTa to the host 1100.

In an exemplary embodiment of the inventive concept, an operation of reading the a-th data DTa stored in the first memory block BLK1 of the pinned turbo write buffer TWB-p may be faster than an operation of reading data stored in the third memory block BLK3 of the user storage UST. In other words, the storage device 1200 according to an exemplary embodiment of the inventive concept may support a fast read operation (e.g., a turbo read operation) with regard to particular data, by storing and retaining the particular data in the turbo write buffer TWB (or the pinned turbo write buffer TWB-p).

In an exemplary embodiment of the inventive concept, the storage device 1200 may inform the host 1100 of the remaining (or free) capacity of the turbo write buffer TWB in response to a request of the host 1100. The storage device 1200 may write information about the remaining free capacity of the turbo write buffer TWB to an available turbo write buffer size field (e.g., "dAvailableTurboWriteBufferSize") of the attributes. The host 1100 may obtain capacity information of the turbo write buffer TWB by reading the available turbo write buffer size field (e.g., by using the Query UPIU).

For example, the storage device 1200 may separately record the remaining capacity of the pinned turbo write buffer TWB-p and the remaining capacity of the non-pinned turbo write buffer TWB-np at the available turbo write buffer size field. As another example, the storage device 1200 may record a total of the remaining capacity of the turbo write buffer TWB at the available turbo write buffer size field. Whether the storage device 1200 records the remaining capacity of the turbo write buffer TWB integrally or individually may be specified through flag setting of the host 1100.

For example, the storage device 1200 may record a smaller capacity than an actual free capacity of the turbo write buffer TWB at the available turbo write buffer size field. In the nonvolatile memory device 1220 such as a flash memory, in the case where a time between consecutive erase operations is smaller than a threshold time, the reliability of data may decrease.

Because the capacity of the turbo write buffer TWB is smaller than the capacity of the user storage UST and the turbo write buffer TWB is used in the SLC scheme, the turbo write buffer TWB may be filled with data more quickly than the user storage UST. In addition, in the case where the host 1100 prefers the turbo write of a high speed, the turbo write buffer TWB may be full of data more quickly.

In the case where data are intensively written in the turbo write buffer TWB, during a short time window, there are performed the following series of operations: a first erase operation is performed on the turbo write buffer TWB, data are written in the turbo write buffer TWB, the data of the turbo write buffer TWB are flushed, a second erase operation is performed on the turbo write buffer TWB, and data are written in the turbo write buffer TWB.

In this case, when a time between the first erase operation and the second erase operation is smaller than the threshold time, the reliability of data that are written in the turbo write buffer TWB after the second erase operation may decrease. To increase reliability, even though a particular memory block of the turbo write buffer TWB does not store valid data and is reusable after an erase operation, when a time passing after a previous erase operation of the particular memory block is smaller than the threshold time, the storage device 1200 may record a capacity, from which a capacity of the particular memory block is excluded, at the available turbo write buffer size field.

Figure 11:
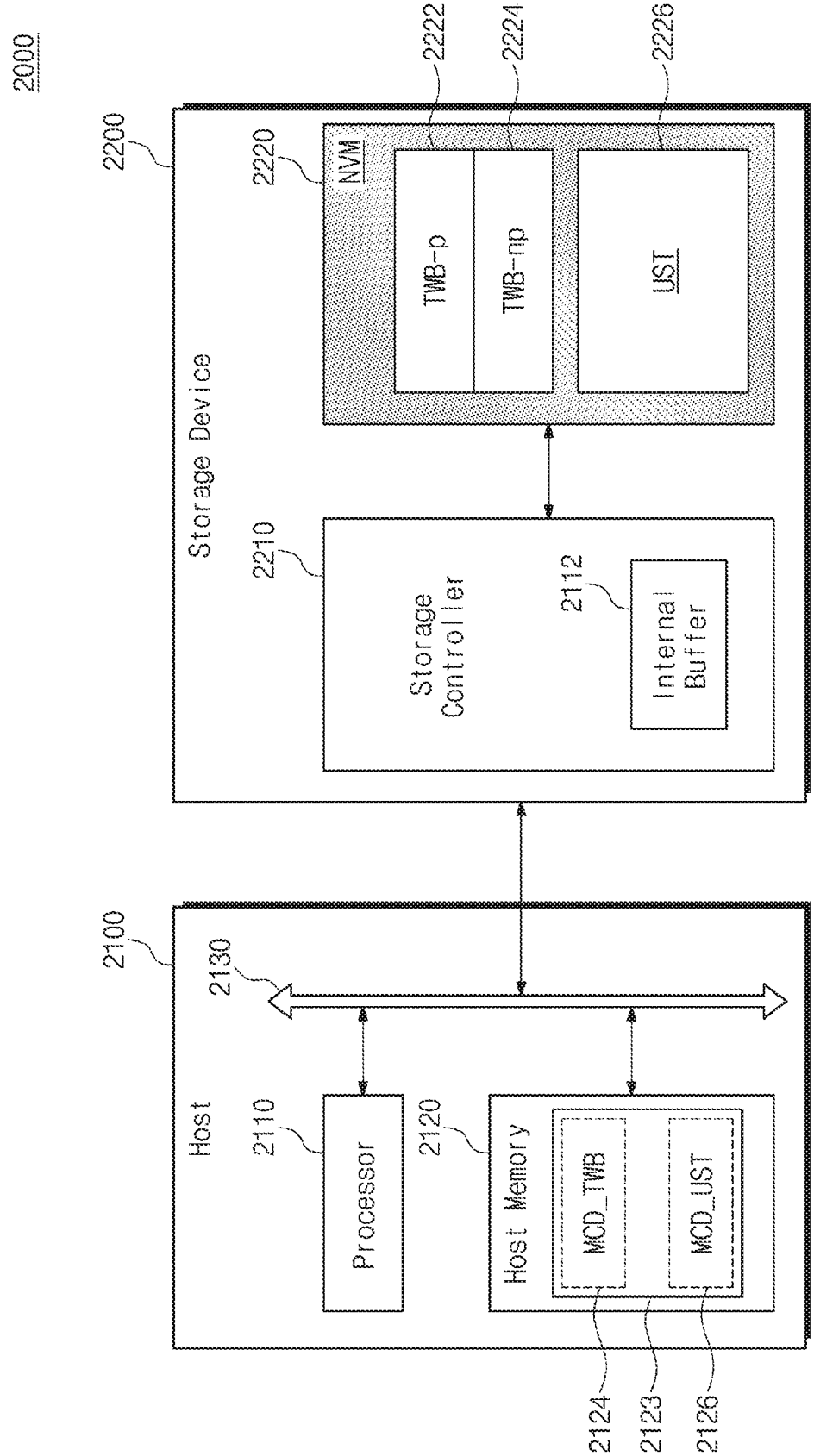
FIG. 11 is a block diagram illustrating a computer system according to an exemplary embodiment of the inventive concept.

FIG. 11 is a block diagram illustrating a computer system according to an exemplary embodiment of the inventive concept.

Referring to FIG. 11, a computer system 2000 may include a host 2100 and a storage device 2200. The computer system 2000 may be one of electronic devices such as, for example, a desktop computer, a laptop computer, a tablet computer, a smartphone, a wearable device, a workstation, one or more servers, an electric vehicle, home applications, a medical device, etc.

The host 2100 may access the storage device 2200, for example, for the purpose of reading data. The storage device 2200 stores or reads data in or from a nonvolatile memory device 2220 in response to a write or read request of the host 2100. The host 2100 may include, for example, a processor 2110, a host memory 2120, and an interface circuit 2130.

The processor 2110 executes an application program, an operating system OS, and various kinds of drivers loaded onto the host memory 2120.

An application program, a file system, a device driver, etc. may be loaded onto the host memory 2120. In addition, various software that is driven at the host 2100 or data may be loaded onto the host memory 2120. For example, the host 2100 may allocate a partial area of the host memory 2120 for a buffer area for storing meta data of the storage device 2200. Here, the meta data of the storage device 2200 may be, for example, map data MD or map cache data MCD. Below, the partial region of the host memory 2120, which is allocated for a buffer of the storage device 2200, is referred to as a "storage allocation area (SAA) 2123". The map data MD may include first map data corresponding to the pinned turbo write buffer TWB-p, second map data corresponding to the non-pinned turbo write buffer TWB-np, and third map data corresponding to the user storage UST. Such first map data may be used to update corresponding first map cache data, such second map data may be used to update corresponding second map cache data, and such third map data may be used to update corresponding third map cache data.

The storage allocation area 2123 is allocated to allow the storage device 2200 to use the host memory 2120 as a buffer of the storage device 2200. For example, meta data such as map cache data (respectively marked by "MCD_TWB" and "MCD_UST" in FIG. 11) 2124 and 2126 are stored in the storage allocation area 2123 in an exemplary embodiment. The map cache data 2124 and 2126 may include map cache data MCD_TWB and MCD_UST, respectively associated with a turbo write buffer 2222, 2224 and user storage 2226 of the storage device 2200. The write buffer 2222 may be a pinned turbo write buffer, and the write buffer 2224 may be a non-pinned turbo write buffer. Each of the map cache data MCD_TWB and MCD_UST stored in the storage allocation area 2123 is managed depending on a priority for each corresponding area. For example, in a page cache operation, a survival time of the map cache data 2124 corresponding to the turbo write buffer 2222, 2224 may be set to be longer than a survival time of the map cache data 2126 corresponding to the user storage 2226. This will be described in further detail below.

Once the storage allocation area 2123 is allocated in the host memory 2120 for a buffer of the storage device 2200, with regard to the storage allocation area 2123, the storage device 2200 may operate as a master, and the host memory 2120 may operate as a slave. Alternatively, in the case of using a virtual memory, the storage allocation area 2123 may be managed on one memory map with an internal buffer 2112 of a storage controller 2210.

The interface circuit 2130 provides a physical connection between the host 2100 and the storage device 2200. For example, the interface circuit 2130 converts a command, an address, data, etc. corresponding to various access requests generated from the host 2100 into a format suitable for an interface scheme with the storage device 2200. An access request transmitted from the host 2100 to the storage device 2200 may cause the storage device 2200 to transfer map data MD to the host 2100 in response to the access request example, in response to such an access request, the storage device 2200 may transfer, to the host, first map data corresponding to the pinned turbo write buffer TWB-p, second map data corresponding to the non-pinned turbo write buffer TWB-np, and third map data corresponding to the user storage UST. A protocol of the interface circuit 2130 may include at least any one of, for example, universal serial bus (USB), small computer system interface (SCSI), PCI express, ATA, parallel ATA (PATA), serial ATA (SATA), serial attached SCSI (SAS), and universal flash storage (UFS). Herein, it is assumed that the interface circuit 2130 includes a universal flash storage (UFS) interfacing protocol.

The storage device 2200 may be provided as data storage of the host 2100. The storage device 2200 may include the storage controller 2210 and the nonvolatile memory device 2220. The storage device 2200 may access the nonvolatile memory device 2220 in response to a command CMD from the host 2100, or may perform various operations requested by the host 2100.

The storage controller 2210 provides interfacing between the host 2100 and the storage device 2200. The storage controller 2210 may write data in the nonvolatile memory device 2220 depending on a request from the host 2100. In addition, the storage controller 2210 may output data stored in the nonvolatile memory device 2220 to the host 2100 in response to a command from the host 2100. The storage controller 2210 may include the internal buffer 2112.

The storage controller 2210 may manage various meta data necessary to manage the nonvolatile memory device 2220. The meta data may be stored in the nonvolatile memory device 2220, and may be read from the nonvolatile memory device 2220 when the storage controller 2210 requires the meta data. For example, the meta data that are managed by the storage controller 2210 may include the map data MD. The map data MD may include mapping information between physical addresses of a storage space of the nonvolatile memory device 2220 and logical addresses assigned by the host device to the storage device 2200.

The storage controller 2210 may load a portion of the map data MD (e.g., the portion required to perform a request from the host device or a background operation) onto the internal buffer 2112 as the map cache data MCD. The internal buffer 2112 may be, for example, a static random access memory (SRAM). In the case in which the map cache data MCD are updated when the storage controller 2210 performs an operation corresponding to a request of the host 2100 or performs a background operation, the updated portion may be written in the nonvolatile memory device 2220 such that the updated portion is applied to the map data MD of the nonvolatile memory device 2220.

A capacity of the internal buffer 2112 of the storage controller 2210 may be smaller than a capacity of the map data MD. In this case, the whole map data MD cannot be loaded onto the storage controller 2210. In the case in which a portion of the map data MD, which is necessary to perform a request of the host 2100 or a background operation, is not loaded onto the storage controller 2210 as the map cache data MCD, the storage controller 2210 may delete a portion of the map cache data MCD or may write the portion of the map cache data MCD in the nonvolatile memory device 2220, and the storage controller 2210 may read a necessary portion of the map data MD from the nonvolatile memory device 2220. This causes an increase in the time necessary to perform the request of the host 2100 or the background operation.

To prevent or reduce this time increase, the storage device 2200 is configured to transfer all or a portion of the map data MD to the host 2100. The host 2100 is configured to store all or a portion of the map data MD transferred from the storage device 2200 in the storage allocation area 2123 as the map cache data MCD. Subsequently, the host 2100 may transfer a read request to the storage device 2200 with reference to the map cache data MCD. In this case, the time necessary for the storage device 2200 to perform the request of the host 2100 may decrease, and the performance of the storage device 2200 and the computer system 2000 may be improved.

For example, the map cache data MCD stored in the storage allocation area 2123 in an exemplary embodiment may be divided and managed depending on the corresponding areas of the storage device 2200. For example, in the map cache data MCD stored in the storage allocation area 2123, the map cache data TWB_MCD corresponding to the turbo write buffer 2222, 2224 may be managed with a higher priority than the map cache data UST_MCD corresponding to the user storage 2226. Also, a priority assigned to map cache data corresponding to the pinned turbo write buffer 2222 may be different from a priority assigned to map cache data corresponding to the non-pinned turbo write buffer 2224. For example, in an exemplary embodiment, a priority assigned to map cache data corresponding to the pinned turbo write buffer 2222 may be higher than a priority assigned to map cache data corresponding to the non-pinned turbo write buffer 2224. In an exemplary embodiment, each of a priority assigned to map cache data corresponding to the turbo write buffer 2222 and a priority assigned to map cache data corresponding to the non-pinned turbo write buffer 2224 may be higher than a priority assigned to map cache data corresponding to the user storage 2226.

The nonvolatile memory device 2220 is provided as a storage medium of the storage device 2200. The nonvolatile memory device 2220 may include the pinned turbo write buffer 2222, the non-pinned turbo write buffer 2224, and the user storage 2226 described with reference to FIG. 8.

According to an exemplary embodiment of the inventive concept, the storage device 2200 may transfer the map cache data MCD for each area of the nonvolatile memory device 2220 to the host 2100. The storage device 2200 may add an identifier corresponding to an area to map cache data for each area, and may transfer the map cache data including the added identifier. The host 2100 may store and manage the map cache data MCD for each area provided from the storage device 2200 in the storage allocation area 2123 provided in the host memory 2120. In a read request, the host 2100 may perform an access to the nonvolatile memory device 2220 by using map cache data stored in the storage allocation area 2123. In addition, in the case in which the map data MD are changed by a read or write operation, changed map cache data may be provided to the host 2100 such that the host 2100 updates the map cache data MCD.

Figure 12:
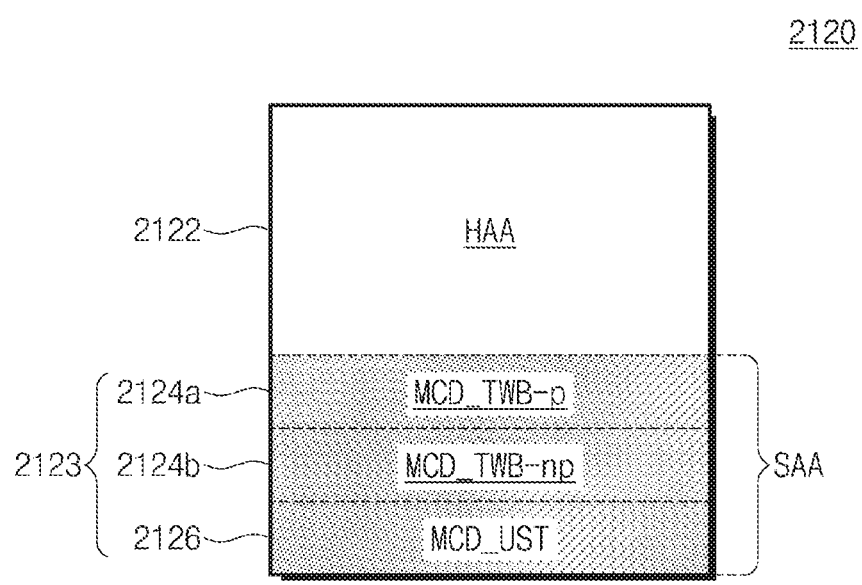
FIG. 12 is a memory map illustrating an allocation structure of a host memory of FIG. 11 according to an exemplary embodiment of the inventive concept.

FIG. 12 is a memory map illustrating an allocation structure of a host memory of FIG. 11 according to an exemplary embodiment of the inventive concept.

Referring to FIG. 12, the host memory 2120 may be divided into a host allocation area (HAA) 2122 and the storage allocation area (SAA) 2123 in which the map cache data MCD are stored.

Data for various operations of the host 2100 are stored in the host allocation area 2122. For example, various functions that an application program, an operating system, or the processor 2110 calls may be loaded onto the host allocation area 2122.

The map cache data MCD for each area of the storage allocation area 2123 may be loaded onto the storage allocation area 2123. For example, map cache data MCD_TWB-p 2124a, MCD_TWB-np 2124b, and MCD_UST 2126 associated with the turbo write buffer 2222, 2224 and the user storage 2226 are loaded onto the storage allocation area 2123. When providing the map cache data MCD_TWB-p 2124a, MCD_TWB-np 2124b, and MCD_UST 2126, the storage device 2200 may mark and transfer identifiers for respective areas thereon. With regard to a management operation of the host memory 2120, the host 2100 may manage the map cache data MCD_TWB-p 2124*a*, MCD_TWB-np 2124*b*, and MCD_UST 2126 with different priorities.

In a page cache operation, the host 2100 may manage the storage allocation area 2123 in a scheme to exclude map cache data from a victim target depending on priorities of the map cache data MCD_TWB-p 2124*a*, MCD_TWB-np 2124*b*, and MCD_UST 2126. Accordingly, map cache data having a high priority may have a long lifetime in the storage allocation area 2123. Alternatively, when a plurality of map cache data of different priorities are provided from the storage device 2200, the host 2100 may first update map cache data of a high priority. For example, the map cache data MCD_TWB-p 2124*a* corresponding to the pinned turbo write buffer TWB-p may have a higher priority than the map cache data MCD_UST 2126 of the user storage UST. In this case, the map cache dataMCD_TWB-p 2124*a* corresponding to the pinned turbo write buffer TWB-p may be updated before the map cache data MCD_UST 2126 of the user storage UST.

According to the above-described management scheme, map cache data of an area that is frequently accessed may be present in the storage allocation area 2123 during a relatively long time. Accordingly, when the storage device 2200 is accessed by the host 2100, a hit rate of map cache data stored in the internal buffer 2112 or the host memory 2120 may increase.

The nonvolatile memory device 2220 may include the turbo write buffers 2222 and 2224 in which high-speed write and read operations are possible. A high access speed may be provided through the turbo write buffers 2222 and 2224. In addition, a read speed may be further improved by managing the map cache data MCD of the turbo write buffers 2222 and 2224 at the host memory 2120.

Figure 13A:
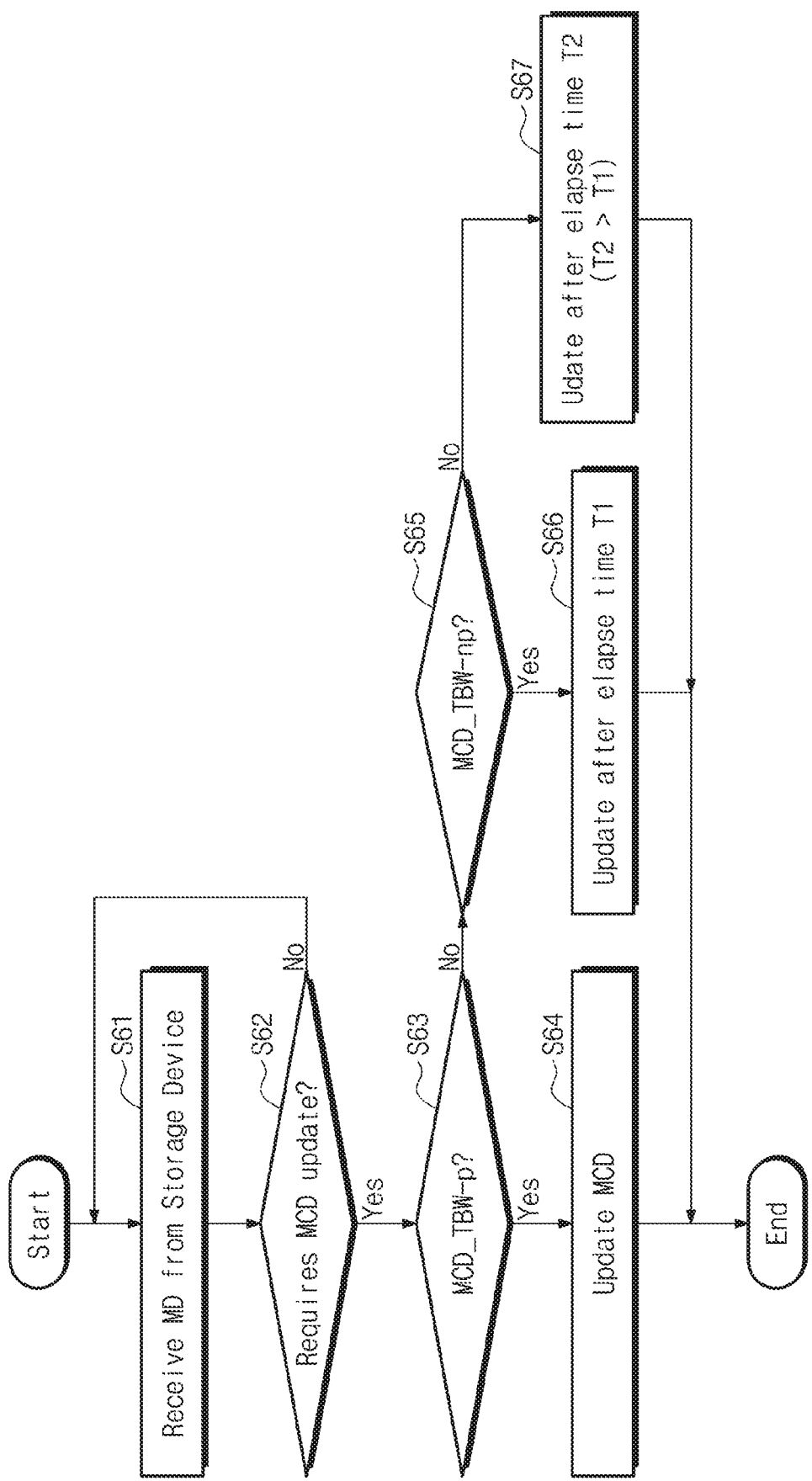
FIGS. 13A and 13B are flowcharts illustrating an example of a memory management operation performed at a host of FIG. 11 according to an exemplary embodiment of the inventive concept.
Figure 13B:
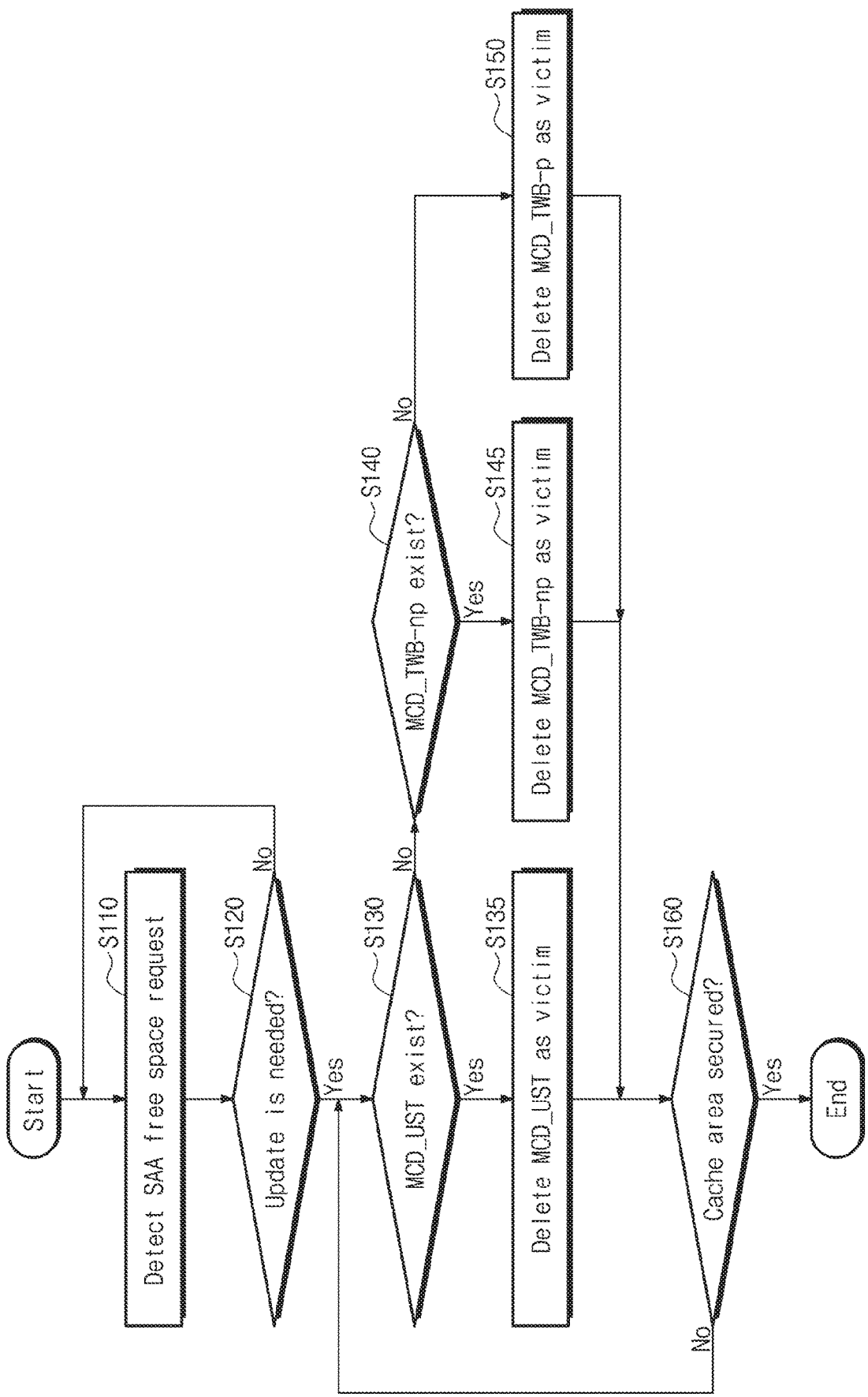

FIGS. 13A and 13B are flowcharts illustrating an example of a memory management operation performed at a host of FIG. 11 according to an exemplary embodiment of the inventive concept.

The host 2100 may manage the map cache data MCD stored in the host memory 2120 depending on priorities. For example, the map cache data MCD of a high priority may have a priority with regard to an update. Alternatively, the map cache data MCD of a high priority may have a low deletion priority in a page cache operation.

Referring to FIG. 13A, the host 2100 updates the map cache data MCD stored in the host memory 2120 by using the map data MD or the map cache data MCD provided from the storage device 2200. For example, the map cache data MCD may have a different update priority depending on a relevant area.

In operation S61, the host 2100 receives the map data MD or the map cache data MCD provided from the storage device 2200. The map data MD or the map cache data MCD may be included in a response following a read or write command. Alternatively, the host 2100 may request the map data MD or the map cache data MCD from the storage device 2200 through a separate command.

In operation S62, the host 2100 determines whether the map cache data MCD managed at the host memory 2120 needs to be updated, based on a result of comparing the map data MD or the map cache data MCD received from the storage device 2200. When it is determined that it is unnecessary to update the map cache data MCD (No), the procedure proceeds to operation S61 to receive new map data MD. When it is determined that it is necessary to update the map cache data MCD (Yes), the procedure proceeds to operation S63.

In operation S63, it is determined whether the received map data MD or the received map cache data MCD correspond to the pinned turbo write buffer TWB-p. When it is determined that the received map data MD or the received map cache data MCD correspond to the pinned turbo write buffer TWB-p (Yes), the procedure proceeds to operation S64. In contrast, when it is determined that the received map data MD or the received map cache data MCD do not correspond to the pinned turbo write buffer TWB-p (No), the procedure proceeds to operation S65.

In operation S65, it is determined whether the received map data MD or the received map cache data MCD correspond to the non-pinned turbo write buffer TWB-np. When it is determined that the received map data MD or the received map cache data MCD correspond to the non-pinned turbo write buffer TWB-np (Yes), the procedure proceeds to operation S66. In contrast, when it is determined that the received map data MD or the received map cache data MCD do not correspond to the non-pinned turbo write buffer TWB-np (No), the procedure proceeds to operation S67.

In operation S64, because the received map data MD or the received map cache data MCD correspond to the pinned turbo write buffer TWB-p, the map cache data MCD are immediately updated. In operation S66, because the received map data MD or the received map cache data MCD correspond to the non-pinned turbo write buffer TWB-np, the map cache data MCD are updated after an elapsed time T1 passes. When new map data MD or new map cache data MCD are received before the elapsed time T1 does not pass, the procedure proceeds to operation S61. In operation S67, because the received map data MD or the received map cache data MCD do not correspond to the turbo write buffer TWB, the map cache data MCD are updated after an elapsed time T2, which is longer than time T1, passes. When new map data MD or new map cache data MCD are received before the elapsed time T2 does not pass, the procedure proceeds to operation S61.

A method of managing the host memory 2120 depending on update priorities of the map cache data MCD_TWB-p, MCD_TWB-np, and MCD_UST is described above. However, updating the map cache data MCD_TWB-p, MCD_TWB-np, and MCD_UST in consideration of priorities is not limited to the above description. For example, in an exemplary embodiment, priorities may be changed based on various references that comply with a policy of managing the map cache data MCD_TWB-p, MCD_TWB-np, and MCD_UST.

Referring to FIG. 13B, the host 2100 manages the host memory 2120. For example, the host 2100 may perform the page cache operation for the purpose of efficiently managing the map cache data MCD within a limited memory size.

In operation S110, the host 2100 detects an update request for the map cache data MCD stored in the storage allocation area 2123 of the host memory 2120. For example, when new map cache data MCD are transferred from the storage device 2200, the host 2100 may start the page cache operation for updating the map cache data MCD of the storage allocation area 2123.

In operation S120, the host 2100 determines whether the map cache data MCD needs to be updated. When it is determined that it is unnecessary to update the map cache data MCD (No), the procedure proceeds to operation S110 to continue to detect the update request for the map cache data MCD. When it is determined that it is necessary to update the map cache data MCD (Yes), the procedure proceeds to operation S130.

In operation S130, the host 2100 determines whether the map cache data MCD_UST associated with the user storage 2226 of the lowest priority are present in the storage allocation area 2123. Alternatively, the host 2100 may determine whether a size of the map cache data MCD_UST occupying the storage allocation area 2123 is a reference size or larger. When it is determined that the map cache data MCD_UST are present in the storage allocation area 2123 (Yes), the procedure proceeds to operation S135. When it is determined that the map cache data MCD_UST are absent from the storage allocation area 2123 (No), the procedure proceeds to operation S140.

In operation S135, the host 2100 selects, as a victim, the map cache data MCD_UST associated with the user storage 2226, and deletes the selected map cache data MCD_UST. Herein, when data is referred to as a victim, it means that the data is to be deleted. A memory size that is secured as the map cache data MCD_UST are deleted may be provided as an area for storing the map cache data MCD to be updated later.

In operation S140, the host 2100 determines whether the map cache data MCD_TWB-np associated with the non-pinned turbo write buffer 2224 are present in the storage allocation area 2123. When it is determined that the map cache data MCD_TWB-np are present in the storage allocation area 2123 (Yes), the procedure proceeds to operation S145. In contrast, when it is determined that the map cache data MCD_TWB-np are absent from the storage allocation area 2123 (No), the procedure proceeds to operation S150.

In operation S145, the host 2100 selects, as a victim, the map cache data MCD_TWB-np associated with the non-pinned turbo write buffer 2224, and deletes the selected map cache data MCD_TWB-np. A memory size that is secured as the map cache data MCD_TWB-np are deleted may be provided as an area for storing the map cache data MCD to be updated later.

In operation S150, the host 2100 selects, as a victim, the map cache data MCD_TWB-p associated with the pinned turbo write buffer 2222, and deletes the selected map cache data MCD_TWB-p.

In operation S160, the host 2100 determines whether a sufficient memory area is secured in the storage allocation area 2123 of the host memory 2120. When an additional memory area for the page cache operation is still required (No), the procedure proceeds to operation S130 for the purpose of deleting map cache data with regard to the page cache operation. However, when it is determined that a sufficient memory area for the page cache operation is secured, the memory securing operation are terminated.

In an exemplary embodiment, in a page cache operation, the delete priority of the map cache data MCD_UST is higher than each of the delete priority of the map cache data MCD_TWB-p and the delete priority of the map cache data MCD_TWB-np. In an exemplary embodiment, in a page cache operation, the delete priority of the map cache data MCD_TWB-np is higher than the delete priority of the map cache data MCD_TWB-p.

Performing a management operation based on priorities of the map cache data MCD_TWB-p, MCD_TWB-np, and MCD_UST is described above. However, updating the map cache data MCD_TWB-p, MCD_TWB-np, and MCD_UST in consideration of priorities is not limited to the above description. For example, in an exemplary embodiment, priorities may be changed based on various references that comply with a policy of managing the map cache data MCD_TWB-p, MCD_TWB-np, and MCD_UST. For example, ranks of priorities may be different from those described above with reference to FIGS. 13A and 13B.

Figure 14:
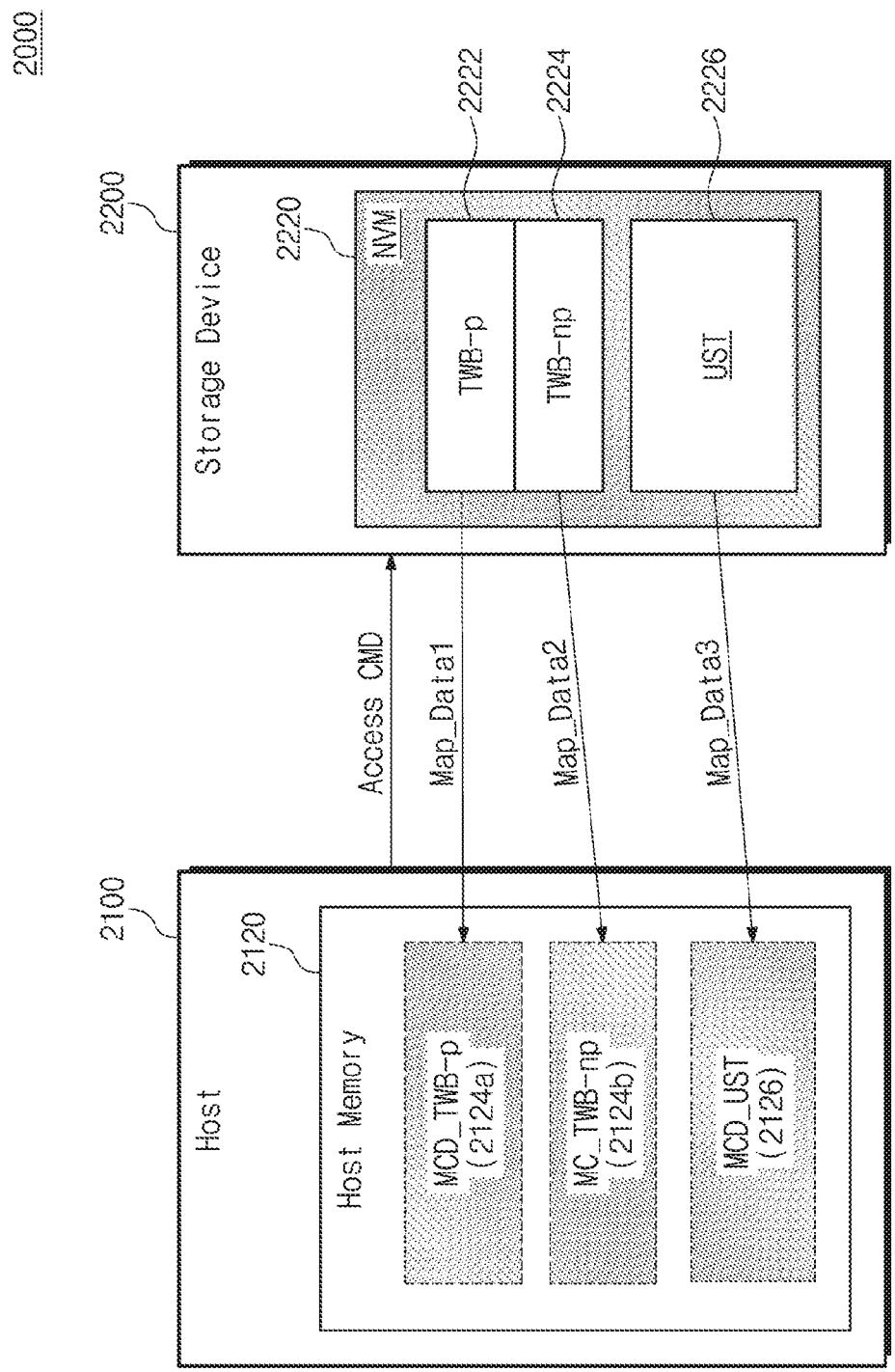
FIG. 14 is a block diagram illustrating an example of transferring map cache data to a host memory according to an exemplary embodiment of the inventive concept.

FIG. 14 is a block diagram illustrating an example of transferring the map cache data MCD to a host memory according to an exemplary embodiment of the inventive concept.

Referring to FIG. 14, the storage device 2200 may transfer the map cache data MCD to the host 2100 in response to an access command or a buffer read command of the host 2100.

The storage device 2200 may load and transfer the map cache data MCD corresponding to access-requested data onto a response packet (e.g., a response UPIU) for a read command or a write command of the host 2100. In this case, the map cache data MCD of the access-requested data may be transferred by using reserved fields of the response packet.

When a command for an access to the pinned turbo write buffer 2222 is received from the host 2100, the storage device 2200 may perform a read or write operation on a selected area of the pinned turbo write buffer 2222. Subsequently, the storage device 2200 may write the map cache data MCD corresponding to the accessed area in the response packet, and may transfer the response packet to the host 2100. This transfer of the map cache data MCD may be identically applied to operations of accessing the non-pinned turbo write buffer 2224 and the user storage 2226.

In an exemplary embodiment, when an event occurs in which data are moved from the turbo write buffer 2222, 2224 to the user storage 2226, the storage device 2200 may request a buffer read command from the host 2100. All of the map cache data MCD updated at the internal buffer 2112 (refer to FIG. 11) may be transferred to the host 2100 through the buffer read command.

Figure 15:
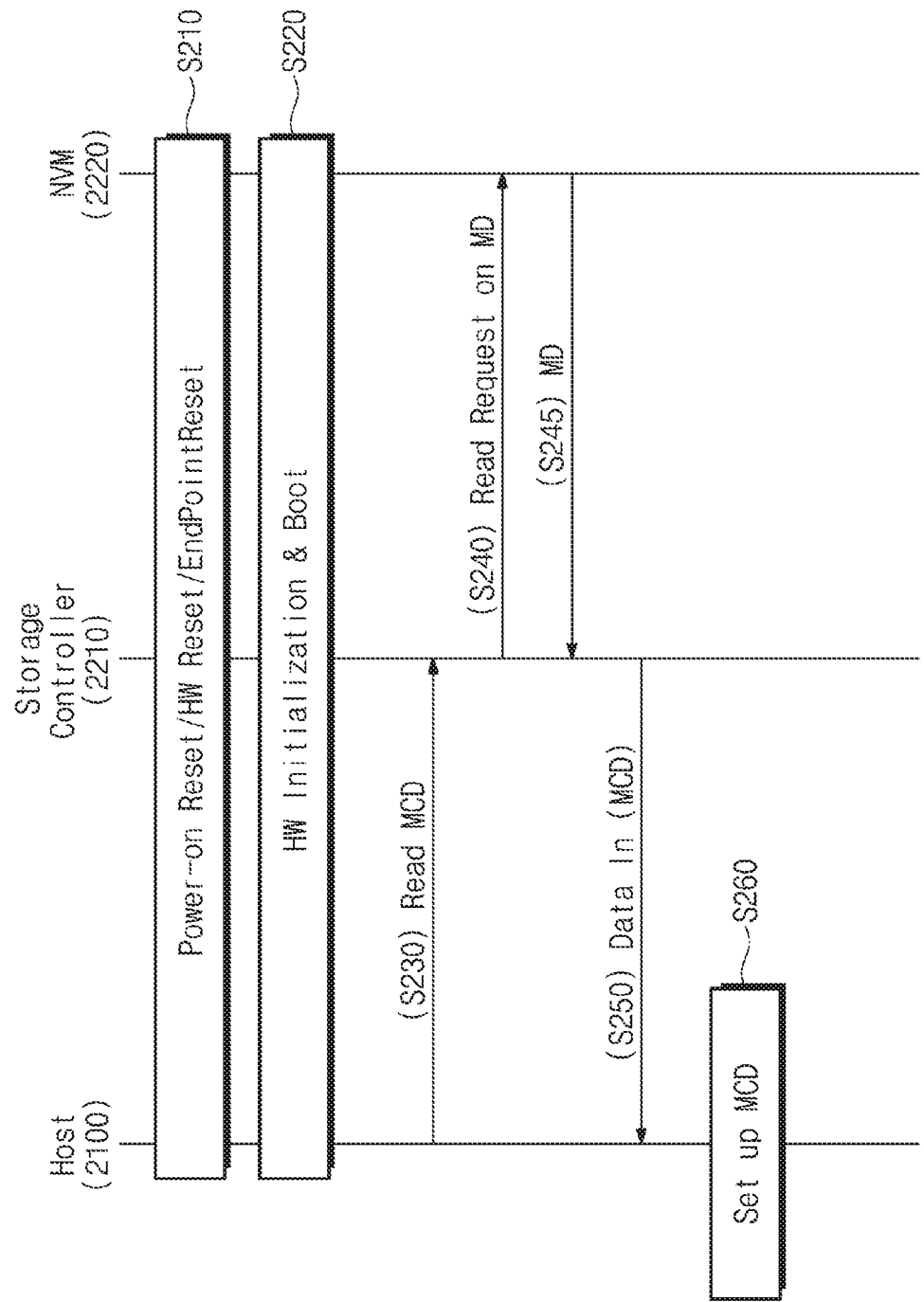
FIG. 15 is a diagram illustrating a method of transferring map cache data according to an exemplary embodiment of the inventive concept.

FIG. 15 is a diagram illustrating a method of transferring the map cache data MCD according to an exemplary embodiment of the inventive concept.

Referring to FIG. 15, in an initialization operation of a computer system 2000 (refer to FIG. 11) according to an exemplary embodiment of the inventive concept, the host 2100 may request the map cache data MCD from the storage device 2200.

In operation S210, the host 2100 and the storage device 2200 may perform an operation such as, for example, a power-on reset (POR) operation, a hardware reset operation, or an endpoint reset operation.

In operation S220, the host 2100 and the storage device 2200 may perform hardware initialization and booting. For example, hardware layers of each of the host 2100 and the storage device 2200 may be initialized and booted.

In operation S230, the host 2100 may request the map cache data MCD from the storage device 2200. After the booting, an initial state of the storage allocation area 2123 of the host memory 2120 may be an empty state. Accordingly, the host 2100 may perform a read request on the storage device 2200 for the purpose of recovering the map cache data MCD at the storage allocation area 2123.

In operation S240, the storage controller 2210 transfers a read request for the map data MD stored in a particular area of the nonvolatile memory device 2220 in response to the request of the host 2100.

In operation S245, the nonvolatile memory device 2220 may read the map data MD stored in the particular area and may output the read map data MD to the storage controller 2210.

In operation S250, the storage controller 2210 may transfer all or a portion of the map data MD read from the particular area of the nonvolatile memory device 2220 to the host 2100 as the map cache data MCD. In this case, the storage controller 2210 may add an identifier or a mark for a relevant area to the map cache data MCD and may transfer the map cache data MCD to the host 2100. For example, the storage controller 2210 may mark the map cache data MCD so as to indicate whether to correspond to any one of the pinned turbo write buffer 2222, the non-pinned turbo write buffer 2224, and the user storage 2226, and may transfer the marked map cache data MCD.

In operation S260, the host 2100 may load the map cache data MCD of the storage allocation area 2123 allocated in the host memory 2120 by using the map cache data MCD provided from the storage controller 2210.

Figure 16:
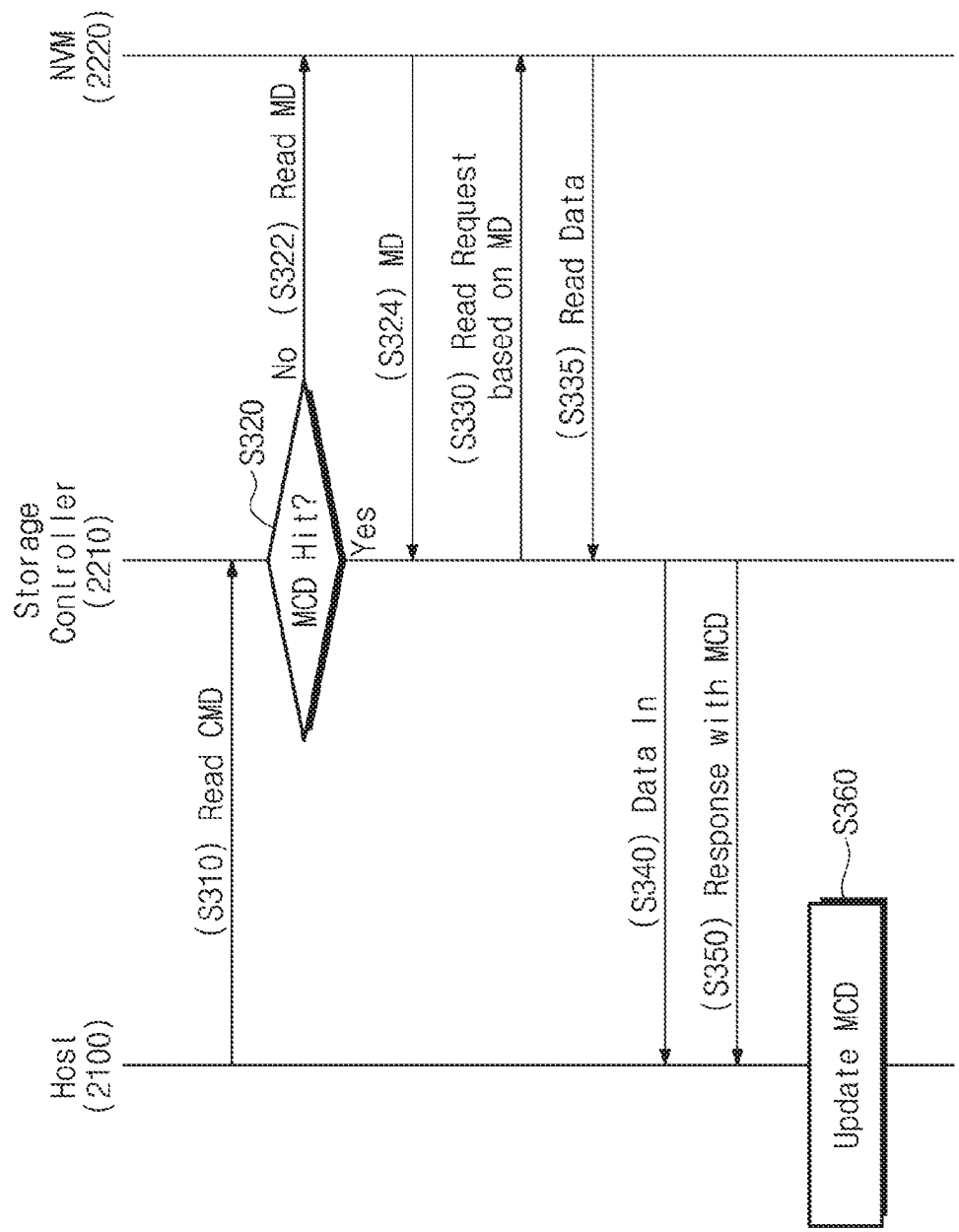
FIG. 16 is a diagram illustrating a method of transferring map cache data according to an exemplary embodiment of the inventive concept.

FIG. 16 is a diagram illustrating a method of transferring the map cache data MCD according to an exemplary embodiment of the inventive concept.

Referring to FIG. 16, the storage device 2200 according to an exemplary embodiment of the inventive concept may transfer the map cache data MCD to the host 2100 through a response in a read operation.

In operation S310, the host 2100 may transfer a read command to the storage device 2200. A read address that is a logical block address of target data to be read may be included in the read command.

In operation S320, the storage controller 2210 detects whether the read address is present in the map cache data MCD (hit). When the read address is present in the map cache data MCD (or a hit occurs) (Yes), the procedure proceeds to operation S330. In contrast, when the read address is absent from the map cache data MCD (or a miss occurs) (No), the procedure proceeds to operation S322.

In operation S322, the storage controller 2210 transfers a read request for the map data MD stored in a particular area of the nonvolatile memory device 2220 to the nonvolatile memory device 2220.

In operation S324, the nonvolatile memory device 2220 reads the map data MD and transfers the read map data MD to the storage controller 2210.

In operation S330, the storage controller 2210 transfers a read request to the nonvolatile memory device 2220 by using the map data MD read from the nonvolatile memory device 2220. For example, the storage controller 2210 may obtain a physical address mapped onto a logical block address based on the map data MD read from the nonvolatile memory device 2220.

In operation S335, the storage controller 2210 receives data from the nonvolatile memory device 2220 using the obtained physical address.

In operation S340, the storage controller 2210 transfers the read data to the host 2100. For example, the read data may be transferred to the host 2100 by using the DATA IN UPIU of the UFS interface.

When the read data are completely transferred, in operation S350, the storage controller 2210 transfers a response including the map cache data MCD to the host 2100. The response may be provided, for example, by using the response UPIU in the case of the UFS interface. In this case, the map cache data MCD may be transferred by utilizing a specified field or reserved fields of the response UPIU.

In operation S360, the host 2100 may update the map cache data MCD by using the map cache data MCD provided from the storage controller 2210.

Figure 17:
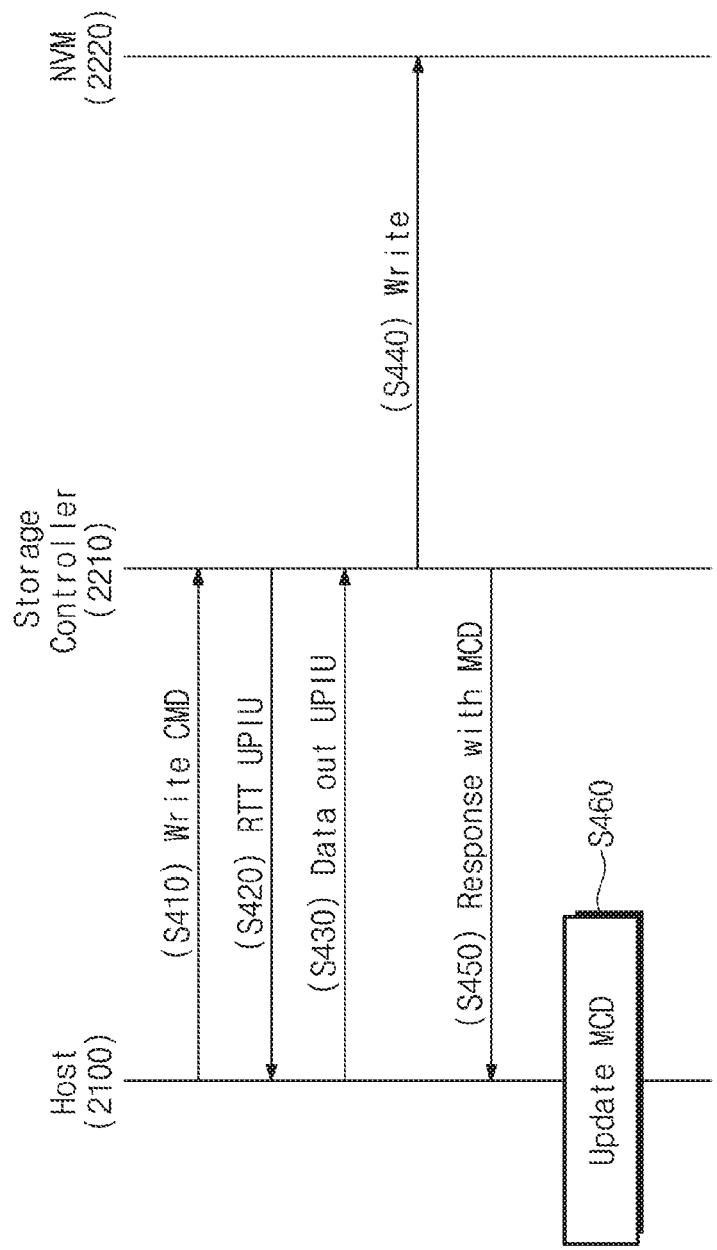
FIG. 17 is a diagram illustrating a method of transferring map cache data according to an exemplary embodiment of the inventive concept.

FIG. 17 is a diagram illustrating a method of transferring the map cache data MCD according to an exemplary embodiment of the inventive concept.

Referring to FIG. 17, in a write operation, the storage device 2200 according to an exemplary embodiment of the inventive concept may load the map cache data MCD or the map data MD on a response to be transferred to the host 2100, and may transfer the response to the host 2100.

In operation S410, the host 2100 may transfer a write command to the storage device 2200. For example, the host 2100 may transfer the command UPIU including the write command to the storage device 2200.

In operation S420, the storage device 2200 may transfer a ready to transfer UPIU (RTT UPIU) to the host 2100. The RTT UPIU may include information about a data range in which the storage device 2200 is able to receive data.

In operation S430, the host 2100 may transfer a DATA OUT UPIU including write data to the storage device 2200, in response to the RTT UPIU. As operation S420 and operation S430 are repeatedly performed, the write data to be written in the storage device 2200 may be transferred from the host 2100 to the storage device 2200.

In operation S440, the storage controller 2210 may program the received write data in the nonvolatile memory device 2220. The write data may be written in at least one of the pinned turbo write buffer 2222, the non-pinned turbo write buffer 2224, and the user storage 2226.

In operation S450, the storage controller 2210 may transfer a response to the host 2100. The storage controller 2210 may transfer the response UPIU including the map cache data MCD or the map data MD to the host 2100. In this case, the map cache data MCD or the map data MD may be transferred by utilizing a specified field or reserved fields of the response UPIU.

In operation S460, the host 2100 may update the map cache data MCD by using the map cache data MCD provided from the storage controller 2210.

Figure 18:
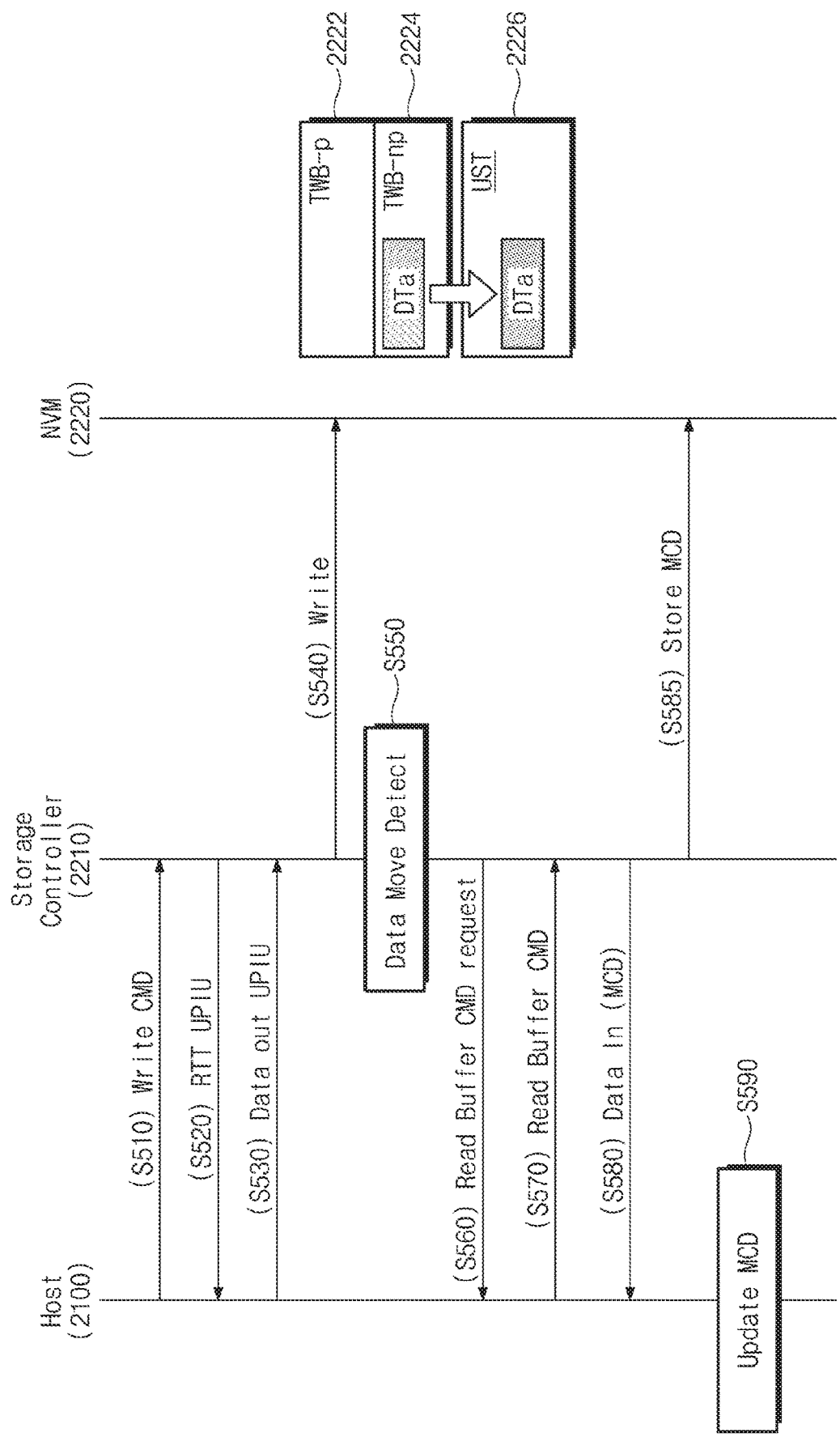
FIG. 18 is a diagram illustrating a method of transferring map cache data according to an exemplary embodiment of the inventive concept.

FIG. 18 is a diagram illustrating a method of transferring the map cache data MCD according to an exemplary embodiment of the inventive concept.

Referring to FIG. 18, the storage device 2200 according to an exemplary embodiment of the inventive concept may transfer accumulated map cache data MCD to the host 2100 in response to a command from the host 2100. For example, this scheme to transfer the map cache data MCD may be utilized in the case in which data are moved in the nonvolatile memory device 2220.

In operation S510, the host 2100 may transfer a write command to the storage device 2200. For example, the host 2100 may transfer the command UPIU including the write command to the storage device 2200.

In operation S520, the storage device 2200 may transfer the RTT UPIU to the host 2100. The RTT UPIU may include information about a data range in which the storage device 2200 is able to receive data.

In operation S530, the host 2100 may transfer a DATA OUT UPIU including write data to the storage device 2200, in response to the RTT UPIU. As operation S520 and operation S530 are repeatedly performed, the write data to be written in the storage device 2200 may be transferred from the host 2100 to the storage device 2200.

In operation S540, the storage controller 2210 may program the received write data in the nonvolatile memory device 2220. The write data may be written in at least one of the pinned turbo write buffer 2222, the non-pinned turbo write buffer 2224, and the user storage 2226.

In operation S550, the storage controller 2210 may detect whether data are moved in the write operation. In this case, the number of times that a physical address mapped onto a logical block address LBA is changed is more than in a simple write operation. Accordingly, the amount of map cache data MCD loaded onto the internal buffer 2112 may become great. A size of this map cache data MCD may be very large to transfer through the response UPIU.

In operation S560, the storage controller 2210 transfers a request that allows the host 2100 to fetch the map cache data MCD stored in the internal buffer 2112 to the host memory 2120. For example, the storage controller 2210 may request a buffer read command from the host 2100.

In operation S570, the host 2100 may transfer the buffer read command to the storage controller 2210. In operation S580, the storage controller 2210 transfers the map cache data MCD stored in the internal buffer 2112 to the host 2100. In addition, the storage controller 2210 may flush the map cache data MCD stored in the internal buffer 2112 to a particular area of the nonvolatile memory device 2220 in operation S585.

In operation S590, the host 2100 may update the map cache data MCD by using the map cache data MCD provided from the storage controller 2210.

Figure 19:
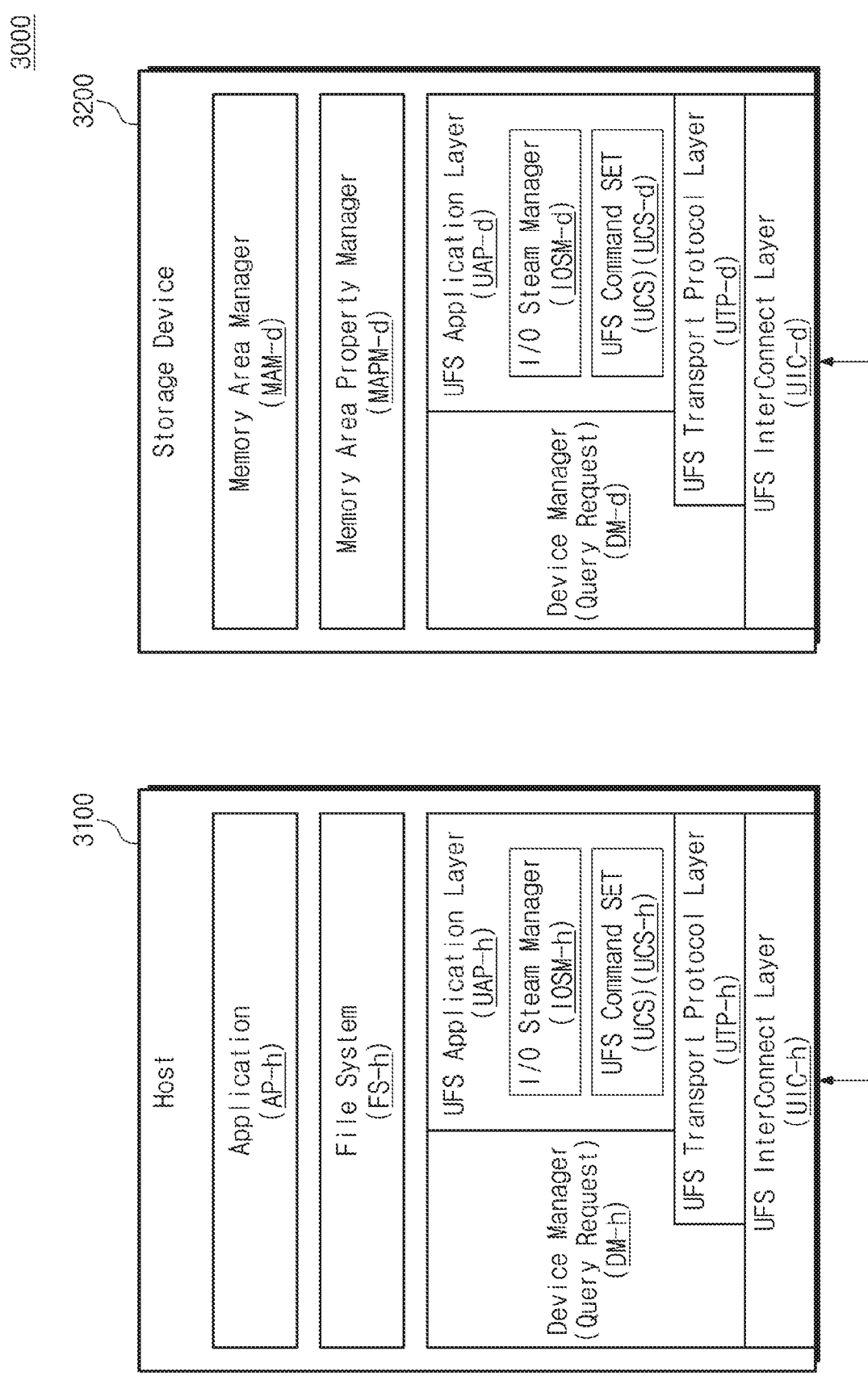
FIG. 19 is a diagram illustrating a hierarchical structure of a storage system of FIG. 1 according to an exemplary embodiment of the inventive concept.

FIG. 19 is a diagram illustrating a hierarchical structure of the storage system 3000 of FIG. 1. Referring to FIG. 19, the storage system 3000 may include the host 3100 and the storage device 3200. The host 3100 may include an application AP-h, a file system FS-h, a device manager DM-h, a UFS application layer UAP-h, a UFS transport protocol layer UTP-h, and a UFS interconnect layer UIC-h.

The application AP-h may include various application programs, processes, etc. that are driven at the host 3100. The file system FS-h may be configured to organize and manage a variety of data generated by the application AP-h. In an exemplary embodiment of the inventive concept, the application AP-h or the file system FS-h may be configured to determine a logical block address range to specify a logical block address range for a particular area, as described with reference to FIGS. 11 to 18. Information about the determined logical block address range may be provided to a lower layer (e.g., the device manager DM-h or the UFS application layer UAP-h).

The UFS application layer UAP-h is configured to support various commands between the host 1100 and the storage device 1200. For example, the UFS application layer UAP-h may include an input/output (I/O) stream manager IOSM-h and a UFS command set UCS-h. The I/O stream manager IOSM-h is configured to manage a request from the application AP-h or the file system FS-h.

In an exemplary embodiment of the inventive concept, the I/O stream manager IOSM-h may be configured to identify a particular value of an input/output from the application AP-h or the file system FS-h. The I/O stream manager IOSM-h may be configured to manage a priority of a request from the application AP-h or the file system FS-h or to support various functions according to the request from the application AP-h or the file system FS-h. In an exemplary embodiment of the inventive concept, the I/O stream manager IOSM-h may be configured to support the turbo write function or the turbo read function.

In an exemplary embodiment of the inventive concept, a particular application or process specified by the host 3100 or a user of the host 3100 may use the turbo write or the turbo read. The I/O stream manager IOSM-h may determine whether to perform the turbo write or the turbo read in response to a write or read request that is made by the particular application or process with regard to the storage device 3200.

In addition, particular data that are managed by the file system FS-h may use the turbo write or the turbo read. The I/O stream manager IOSM-h may determine whether to perform the turbo write or the turbo read in response to the write or read request for the storage device 3200 with regard to particular data (e.g., meta data).

In addition, the I/O stream manager IOSM-h may direct a move of data written in the storage device 3200. The I/O stream manager IOSM-h may adjust a read speed of data written in the storage device 3200 by moving data to the pinned turbo write buffer TWB-p, the non-pinned turbo write buffer TWB-np, or the user storage UST.

In an exemplary embodiment of the inventive concept, the I/O stream manager IOSM-h may determine an area (e.g., the pinned turbo write buffer TWB-p, the non-pinned turbo write buffer TWB-np, or the user storage UST) in which particular data are to be stored depending on attributes of the particular data and may provide information about the determination (e.g., the area information ARI) to the UFS command set UCS-h.

In an exemplary embodiment of the inventive concept, the I/O stream manager IOSM-h may determine a logical block address, at which the particular data are to be stored, based on the attributes of the particular data and a predetermined logical block address range and may provide information about the determined logical block address range to the UFS command set UCS-h.

The UFS command set UCS-h may support various command sets that are supported between the host 3100 and the storage device 3200. In an exemplary embodiment of the inventive concept, the UFS command set UCS-h may include a UFS native command set and a UFS SCSI command set. The UFS command set UCS-h may configure a command to be transferred to the storage device 1200 depending on a request from the application AP-h or the file system FS-h.

In an exemplary embodiment of the inventive concept, the UFS command set UCS-h may be configured to receive various information (e.g., a logical block address, area information, a logical block address range, or range area information) from the I/O stream manager IOSM-h and to generate various commands depending on the methods described with reference to FIGS. 11 to 18.

The UFS application layer UAP-h may further include a task manager that processes commands for a control of a command queue.

The device manager DM-h may manage operations of a device level and configurations of a device level. In an exemplary embodiment of the inventive concept, the device manager DM-h may manage a query request for setting or checking various information of the storage device 3200.

The UFS transport protocol layer UTP-h may provide services for an upper layer. The UFS transport protocol layer UTP-h may generate a command or information provided from the UFS application layer UAP-h, or a query request provided from the device manager DM-h in the form of a UPIU (UFS Protocol Information Unit) packet.

In an exemplary embodiment of the inventive concept, the UFS transport protocol layer UTP-h and the device manager DM-h may communicate with each other through a UDM-SAP (UDM-Service Access Point). The UFS transport protocol layer UTP-h and the UFS application layer UAP-h may communicate with each other through a UTP_CMD_SAP or a UTP_TM_SAP.

The UFS interconnect layer UIC-h may manage a connection with the storage device 3200. In an exemplary embodiment of the inventive concept, the UFS interconnect layer UIC-h may include hardware configurations such as an MIPI Unipro or an MIPI M-PHY physically connected with the UFS interconnect layer UIC-d of the storage device 3200. This way the host 3100 and storage device 3200 can establish a communication channel with each other. In an exemplary embodiment of the inventive concept, the UFS interconnect layer UIC-h and the UFS transport protocol layer UTP-h may communicate through a UIC-SAP, and the UFS interconnect layer UIC-h and the device manager DM-h may communicate through a UIO-SAP.

The storage device 3200 may include a memory area manager MAM-d, a memory area property manager MAPM-d, a device manager DM-d, a UFS application layer UAP-d, a UFS transport protocol layer UTP-d, and a UFS interconnect layer UIC-d. In an exemplary embodiment of the inventive concept, a configuration of the UFS application layer UAP-d, the UFS transport protocol layer UTP-d, and the UFS interconnect layer UIC-d may be similar to that of the UFS application layer UAP-h, the UFS transport protocol layer UTP-h, and the UFS interconnect layer UIC-h of the host 3100 and allows corresponding layers to logically communicate with each other, and thus, additional description will be omitted to avoid redundancy.

The memory area property manager MAPM-d of the storage device 3200 may specify and manage an area where write data received from the host 3100 are to be stored. For example, as described above, depending on the explicit request of the host 3100 or the internal policy, the write data received from the host 3100 may be written in a space of at least one of the pinned turbo write buffer TWB-p, the non-pinned turbo write buffer TWB-np, and the user storage UST. The memory area property manager MAPM-d may select a space, in which the write data received from the host 3100 are to be stored, based on the various schemes described above and may store the write data in the selected space.

As described above, depending on the explicit request of the host 3100 or the internal policy, the memory area manager MAM-d of the storage device 3200 may control data move/flush/migration between the pinned turbo write buffer TWB-p, the non-pinned turbo write buffer TWB-np, and the user storage UST.

The above hierarchical structure and function of each of the host 3100 and the storage device 3200 is merely exemplary, and the inventive concept is not limited thereto.

Figure 20:
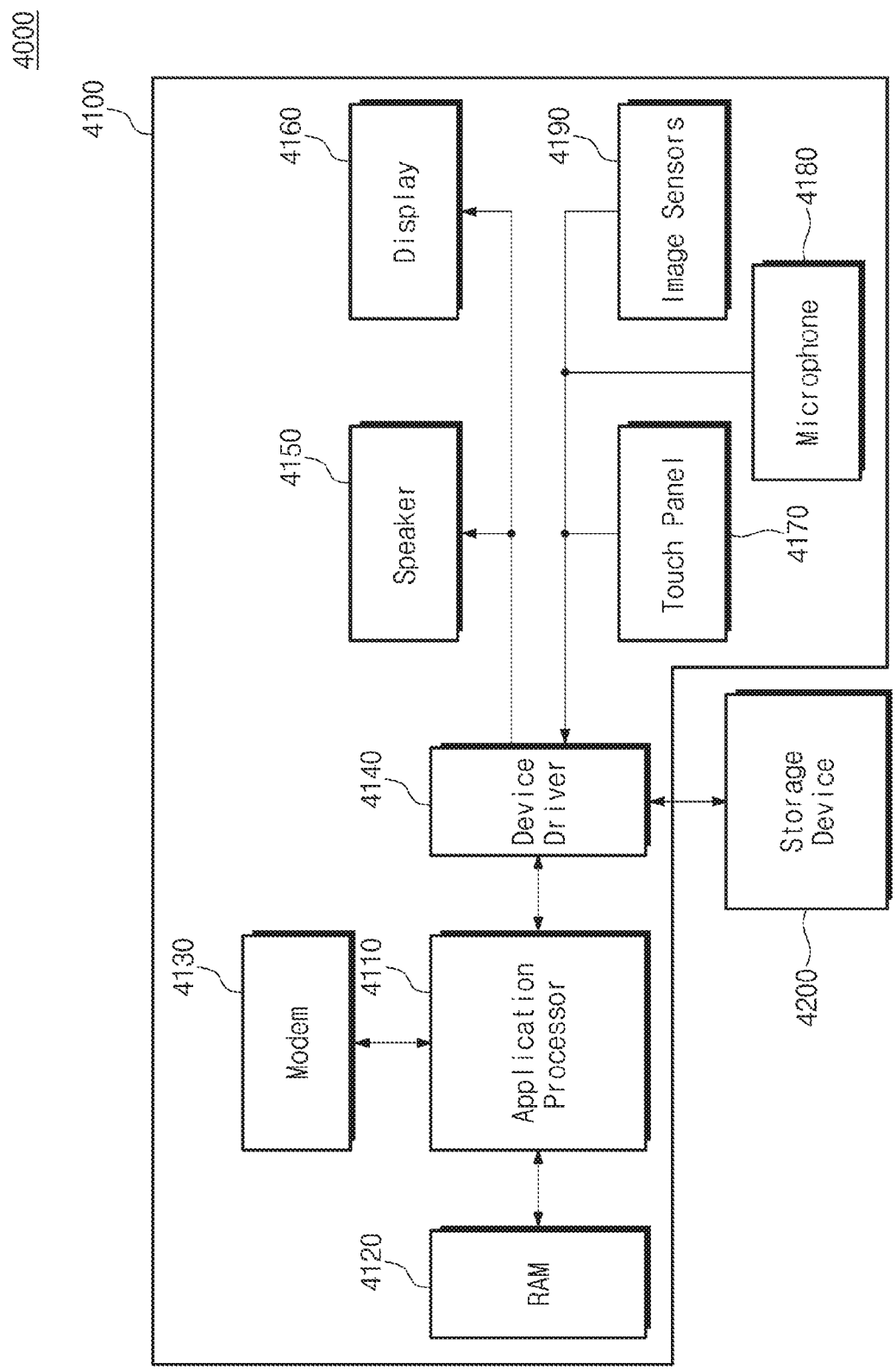
FIG. 20 is a block diagram illustrating a storage system according to an exemplary embodiment of the inventive concept.

FIG. 20 is a block diagram illustrating the storage system 4000 according to an exemplary embodiment of the inventive concept in detail. Referring to FIGS. 19 and 20, the storage system 4000 may include the host 4100 and the storage device 4200. The host 4100 and the storage device 4200 may operate as described with reference to FIGS. 1 to 19.

The host 4100 may include an application processor 4110, a random access memory (RAM) 4120, a modem 4130, a device driver 4140, a speaker 4150, a display 4160, a touch panel 4170, a microphone 4180, and image sensors 4190.

The application processor 4110 may communicate with peripheral devices through the device driver 4140. For example, the application processor 4110 may communicate with the speaker 4150, the display 4160, the touch panel 4170, the microphone 4180, the image sensors 4190, and the storage device 4200 through the device driver 4140.

The device driver 4140 may include the device manager DM-h, the UFS application layer UAP-h, the UFS transport protocol layer UTP-h, and the UFS interconnect layer UIC-h. For example, the device driver 4140 may be embedded in the application processor 4110.

The speaker 4150 and the display 4160 may be user output interfaces that transfer information to the user. The touch panel 4170, the microphone 4180, and the image sensors 4190 may be user input interfaces that receive information from the user.

In an exemplary embodiment of the inventive concept, the storage device 4200 may be used as a high-capacity storage medium of the host 4100. The storage device 4200 may be an embedded type of UFS device or a memory card type of UFS device. The UFS device of the memory card type may be inserted into or detached from an UFS slot included in the host 4100.

Figure 21:
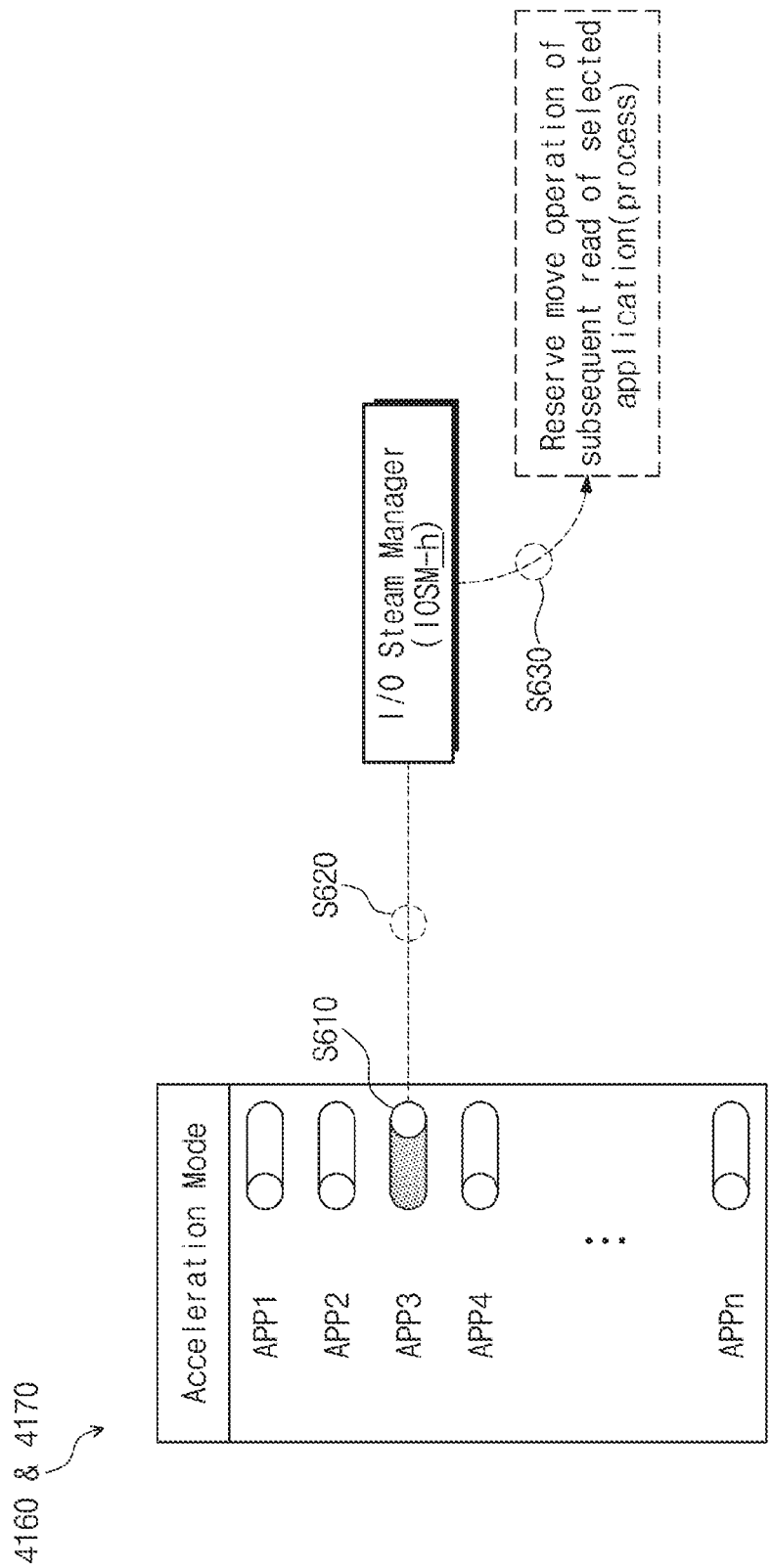
FIG. 21 illustrates a conceptual diagram in which an exemplary embodiment of the inventive concept is applied to a storage system.

FIG. 21 illustrates a diagram in which an exemplary embodiment of the inventive concept is applied to the storage system 1000. Referring to FIGS. 20 and 21, the storage system 4000 may provide setting screens through the display 4160. One of the setting screens may provide information of an acceleration mode to the user.

The storage system 4000 may display a list of first to n-th applications APP1 to APPn, to which the acceleration modes are applicable, through the display 4160. In addition, the storage system 4000 may display, through the display 4160, switches that allow the user to adjust the acceleration modes of the first to n-th applications APP1 to APPn.

In operation S610, the user may touch an enable location of the acceleration mode of the third application APP3. The storage system 4000 may sense a touch of the user, in other words, the directions activating the third application APP3 through the touch panel 4170. In operation S620, information of the third application APP3 or processes of the third application APP3 may be transferred to the I/O stream manager IOSM-h.

As the information of the third application APP3 or the processes of the third application APP3 are received, in operation S630, the I/O stream manager IOSM-h may reserve a move operation of a subsequent read of the third application APP3 or the processes thus selected. For example, the I/O stream manager IOSM-h may set the move attributes MA with respect to data associated with the third application APP3 through the query request UPIU and may include a move flag as the move information MV in the CMD UPIU when a read operation associated with the third application APP3 is required.

As another example, the I/O stream manager IOSM-h may include a move flag and the move attributes MA as the move information MV in the CMD UPIU when a read operation associated with the third application APP3 is required. For example, the I/O stream manager IOSM-h may specify the pinned turbo write buffer TWB-p or the non-pinned turbo write buffer TWB-np as the destination information DST of the move attributes MA.

When the data associated with the third application APP3 are moved to the pinned turbo write buffer TWB-p or the non-pinned turbo write buffer TWB-np, an operation of reading the data associated with the third application APP3 is accelerated. Accordingly, the performance of the third application APP3 may be accelerated.

Figure 22:
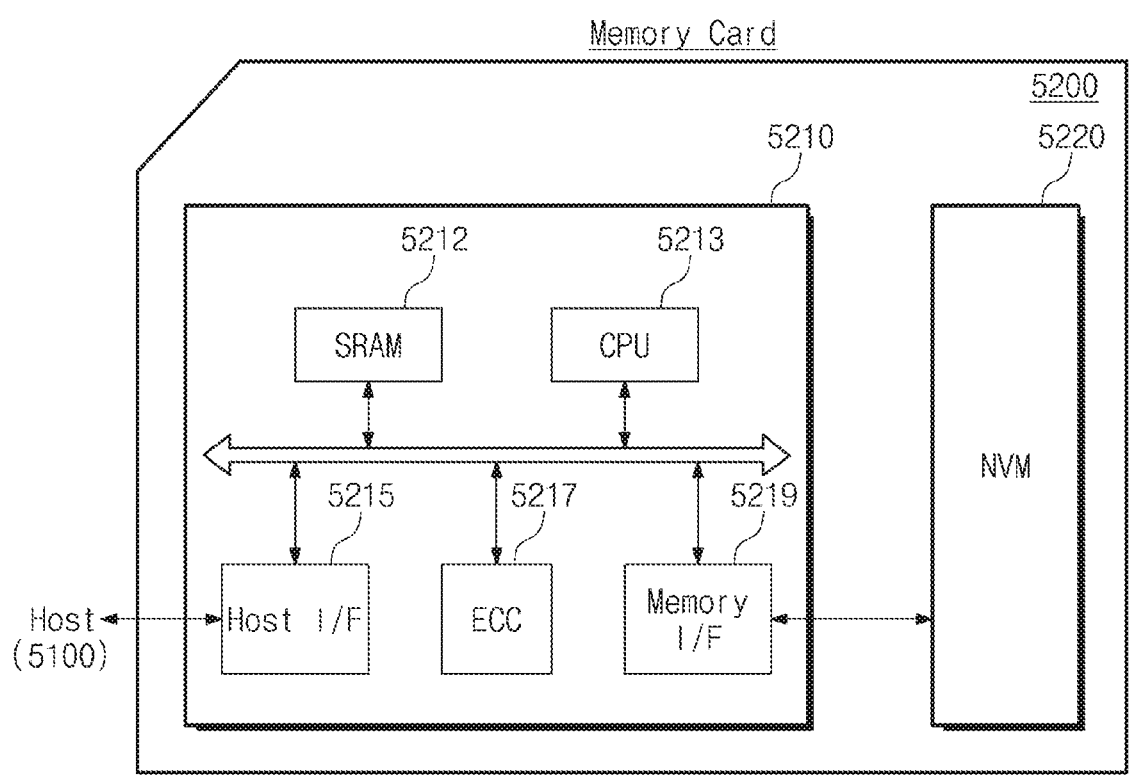
FIG. 22 is a block diagram illustrating a memory card to which a nonvolatile memory system according to exemplary embodiments of the inventive concept is applied.

FIG. 22 is a block diagram illustrating a memory card to which a nonvolatile memory system according to exemplary embodiments of the inventive concept is applied.

Referring to FIG. 22, a memory card 5200 connected with a host 5100 includes a memory controller 5210 and a nonvolatile memory 5220. The memory controller 5210 is connected to the nonvolatile memory 5220. The memory controller 5210 is configured to access the nonvolatile memory 5220. For example, the memory controller 5210 is configured to control a read operation, a write operation, an erase operation, and a background operation of the nonvolatile memory 5220. The background operation includes operations such as, for example, a wear-leveling operation and a garbage collection operation.

For example, the memory controller 5210 may include an SRAM 5212, a CPU 5213, a host interface 5215, an error correction engine 5217, and a memory interface 5219. Similar to the memory controller 1210 or the storage controller 2210 described with reference to FIGS. 1 and 18, the memory controller 5210 provides the map data MD or the map cache data MCD to the host 5100. The host 5100 may manage the map cache data MCD depending on a priority.

The memory controller 5210 may communicate with an external device through the host interface 5215. The memory controller 5210 may communicate with an external device (e.g., a host) in compliance with a particular communication protocol. For example, the memory controller 2215 may be configured to communicate with the external device in compliance with at least one of various communication protocols such as, for example, universal serial bus (USB), multimedia card (MMC), eMMC (embedded MMC), peripheral component interconnection (PCI), PCI-express (PCI-E), advanced technology attachment (ATA), serial-ATA, parallel-ATA, small computer small interface (SCSI), enhanced small disk interface (ESDI), integrated drive electronics (IDE), Firewire, universal flash storage (UFS), and nonvolatile memory express (NVMe).

The nonvolatile memory 5220 may be implemented with various nonvolatile memory devices such as, for example, an electrically erasable and programmable ROM (EE-PROM), a NAND flash memory, a NOR flash memory, a phase-change RAM (PRAM), a resistive RAM (ReRAM), a ferroelectric RAM (FRAM), and a spin-torque magnetic RAM (STT-MRAM).

For example, the memory controller 5210 and the nonvolatile memory 5220 may be integrated in a single semiconductor device. The memory controller 5210 and the nonvolatile memory 5220 may be integrated in a single semiconductor device to constitute a memory card. For example, the memory controller 5210 and the nonvolatile memory 5220 may be integrated in a single semiconductor device to constitute a memory card such as, for example, a PC card (or a personal computer memory card international association (PCMCIA) card), a compact flash card (CF), a smart media card (SM, SMC), a memory stick, a multimedia card (MMC, RS-MMC, MMCmicro, or eMMC), an SD card (SD, miniSD, microSD, or SDHC), and a universal flash storage (UFS).

Figure 23:
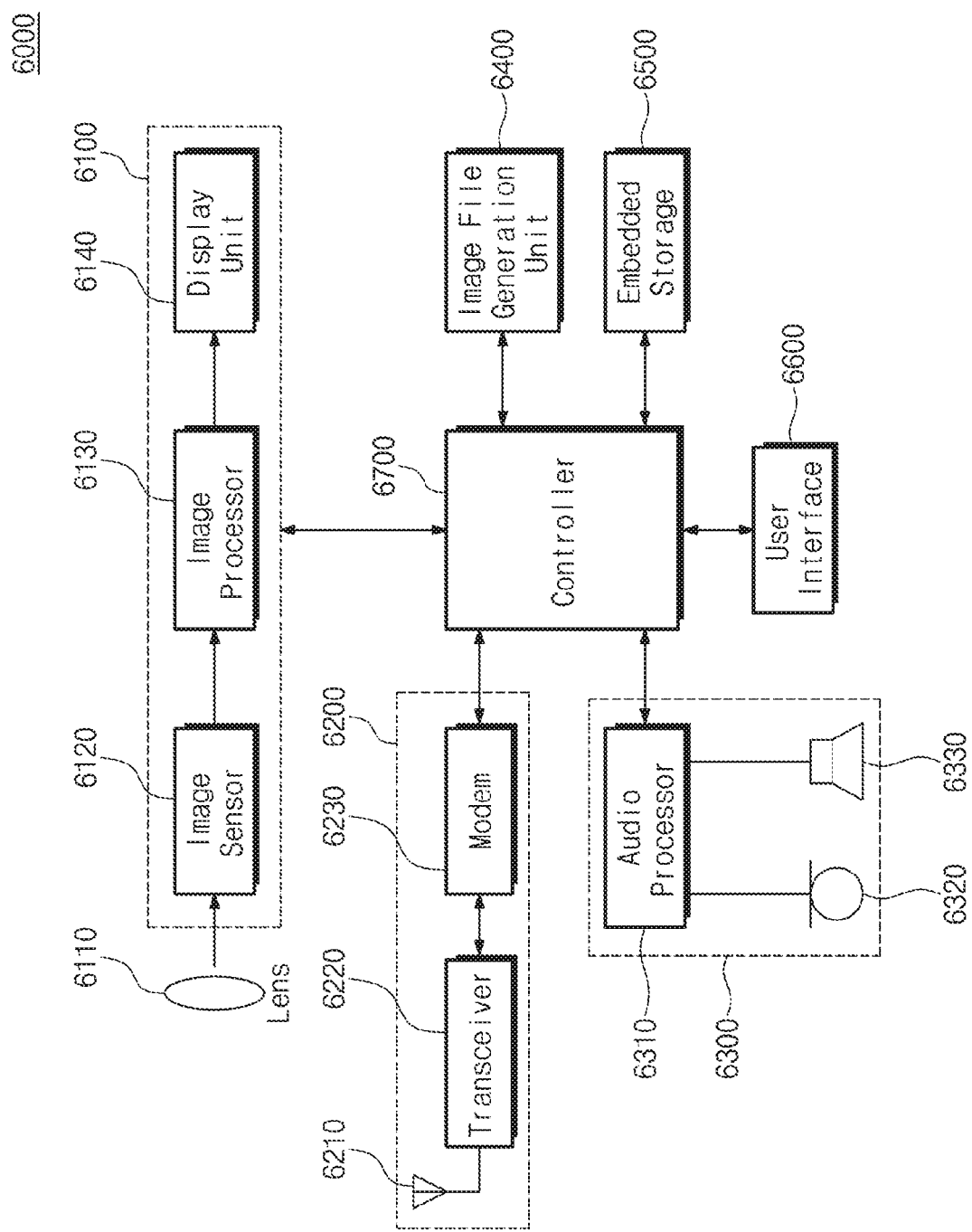
FIG. 23 is a block diagram illustrating a portable terminal including a storage device according to an exemplary embodiment of the inventive concept.

FIG. 23 is a block diagram illustrating a portable terminal including a storage device according to an exemplary embodiment of the inventive concept.

Referring to FIG. 23, a portable terminal 6000 according to an exemplary embodiment of the inventive concept includes an image processing unit 6100, a wireless transceiver unit 6200, an audio processing unit 6300, an image file generation unit 6400, embedded storage 6500, a user interface 6600, and a controller 6700.

The image processing unit 6100 may include an image sensor 6120 sensing a light incident through a lens 6110, an image processor 6130, and a display unit 6140. The wireless transceiver unit 6200 includes an antenna 6210, a transceiver 6220, and a modulator/demodulator (modem) 6230. The audio processing unit 6300 includes an audio processor 6310, a microphone 6320, and a speaker 6330. The image file generation unit 6400 may be a component for generating an image file within the portable terminal 6000. Here, the embedded storage 6500 may be used as storage of the portable terminal 6000. In addition, the embedded storage 6500 may include substantially the same function and configuration as the storage device 1200 or 2200 described with reference to FIGS. 1 to 18.

Here, the embedded storage 6500 may transfer the map data MD or the map cache data MCD to the controller 6700 corresponding to a host. The controller 6700 may manage the map cache data MCD depending on a priority for each area.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

According to an exemplary embodiment of the inventive concept, a host may be provided with meta data from a storage device using a turbo write buffer, and may store and manage the provided meta data. Accordingly, the storage device in which a memory for managing meta data such as map data is insufficient may provide meta data of a relatively large size such that a hit rate increases. Thus, the performance of the storage device may be improved.

While the inventive concept has been described with reference to the exemplary embodiments thereof, it will be apparent to those of ordinary skill in the art that various changes and modifications may be made thereto without departing from the spirit and scope of the inventive concept, as set forth in the following claims.

What is claimed is:
1. A memory system, comprising:
   a storage device comprising a nonvolatile memory device and a storage controller configured to control the nonvolatile memory device; and
   a host configured to access the storage device,
   wherein the nonvolatile memory device comprises a user storage area and a turbo write buffer accessible at a higher speed than the user storage area,
   wherein the storage device transfers map data, in which a physical address of the nonvolatile memory device and a logical address provided from the host are mapped, and an identifier, which indicates whether the map data maps the turbo write buffer or the user storage area, to the host depending on a request of the host,
   wherein the storage device adds the identifier to the map data as part of the transfer;
   wherein the host stores and manages the transferred map data as map cache data, and
   wherein the map cache data are managed depending on a priority that is determined based on the identifier.
2. The memory system of claim 1, wherein the turbo write buffer comprises:
   a first buffer area in which first stored data are prohibited from moving to the user storage area; and a second buffer area in which second stored data are allowed to move to the user storage area.

3. The memory system of claim 2, wherein the request of the host comprises an access request, and
wherein the storage device transfers, to the host, first map data corresponding to the first buffer area, second map data corresponding to the second buffer area, and third map data corresponding to the user storage area in response to the access request of the host.

4. The memory system of claim 3, wherein the host updates first map cache data by using the first map data, updates second map cache data by using the second map data, and updates third map cache data by using the third map data.

5. The memory system of claim 4, wherein each of an update priority of the first map cache data and an update priority of the second map cache data is higher than an update priority of the third map cache data.

6. The memory system of claim 4, wherein an update priority of the first map cache data is higher than an update priority of the second map cache data.

7. The memory system of claim 4, wherein, in a page cache operation, a delete priority of the third map cache data is higher than each of a delete priority of the first map cache data and a delete priority of the second map cache data.

8. The memory system of claim 7, wherein, in the page cache operation, the delete priority of the second map cache data is higher than the delete priority of the first map cache data.

9. The memory system of claim 3, wherein the storage device further marks the identifier to indicate one of the first to third map data.

10. An operation method of a storage device, comprising:
receiving an access request from a host,
wherein the storage devices comprises a nonvolatile memory device comprising a user storage area and a turbo write buffer providing a higher access speed than the user storage area;
transferring map data configured depending on an execution of the access request, and an identifier indicating whether the map data correspond to the turbo write buffer or the user storage area, to the host; and
configuring and managing, by the host, map cache data by using the map data,
wherein managing the map cache data comprises determining a priority of the map cache data depending on the identifier, and updating or deleting the map cache data depending on the priority, and
wherein the storage device adds the identifier to the map data as part of the transfer.

11. The method of claim 10, wherein the access request corresponds to a write request, and
wherein transferring the map data comprises loading the map data and the identifier on a response packet responsive to the write request, and transferring the response packet to the host.

12. The method of claim 10, wherein the access request corresponds to a write request, and the method further comprises:
detecting a data move between the turbo write buffer and the user storage area occurs as the write request is executed, and storing changed map data changed depending on the data move in an internal buffer of the storage device.

13. The method of claim 12, wherein, when the data move occurs, transferring the map data comprises:
transferring a request for a buffer read command to the host;
transferring, at the host, the buffer read command for requesting the changed map data stored in the internal buffer to the storage device; and
transferring the changed map data stored in the internal buffer and an identifier corresponding to the changed map data to the host.

14. The method of claim 10, wherein the turbo write buffer comprises a first buffer area in which first stored data are prohibited from moving to the user storage area, and a second buffer area in which second stored data are allowed to move to the user storage area, and
wherein first map cache data corresponding to the first buffer area has a higher update priority than second map cache data corresponding to the second buffer area, and the second map cache data has a higher update priority than third map cache data corresponding to the user storage area.

15. The method of claim 14, wherein the third map cache data has a higher delete priority than the second map cache data, and the second map cache data has a higher delete priority than the first map cache data.

16. A storage device which communicates with a host by using a universal flash storage (UFS) interface, the storage device comprising:
a nonvolatile memory device comprising a user storage area and a turbo write buffer area having a higher access speed than the user storage area; and
a storage controller configured to transfer map data, in which physical addresses of the nonvolatile memory device and logical addresses of the host are mapped, to the host,
wherein the storage controller adds an identifier, indicating whether the map data correspond to the user storage area or the turbo write buffer area, to the map data as part of the transfer, and
wherein, in a cache management operation of the map data, an update or delete priority of the map data is determined based on the identifier,
wherein the cache management operation is performed at the host.

17. The storage device of claim 16, wherein the turbo write buffer comprises:
a first buffer area in which first stored data are prohibited from moving to the user storage area; and
a second buffer area in which second stored data are allowed to move to the user storage area.

18. The storage device of claim 16, wherein the map data or the identifier is loaded onto a response packet responsive to an access request provided from the host, and the response packet is transferred to the host.

19. The storage device of claim 16, wherein the storage controller comprises an internal buffer storing the map data, and
wherein the map data or the identifier is transferred to the host in response to a read command for the internal buffer of the host.

* * * * *